(12) United States Patent
Ohata

(10) Patent No.: US 8,284,499 B2
(45) Date of Patent: Oct. 9, 2012

(54) ZOOM LENS AND IMAGING APPARATUS

(75) Inventor: Atsushi Ohata, Tokyo (JP)

(73) Assignee: Sony Corporation, Tokyo (JP)

( * ) Notice: Subject to any disclaimer, the term of this patent is extended or adjusted under 35 U.S.C. 154(b) by 242 days.

(21) Appl. No.: 12/801,415

(22) Filed: Jun. 8, 2010

(65) Prior Publication Data
US 2011/0013288 A1 Jan. 20, 2011

(30) Foreign Application Priority Data

Jul. 16, 2009 (JP) ................................ 2009-167633

(51) Int. Cl.
*G02B 15/14* (2006.01)
(52) U.S. Cl. ........................ 359/689; 359/680; 359/682
(58) Field of Classification Search .................. 359/689, 359/680–682
See application file for complete search history.

(56) References Cited

U.S. PATENT DOCUMENTS

| 4,105,308 | A  | * | 8/1978 | Owen et al. | ................... | 359/716 |
| 2009/0009883 | A1 | * | 1/2009 | Wada | ........................... | 359/689 |
| 2009/0059388 | A1 | * | 3/2009 | Miyata et al. | ................. | 359/686 |

FOREIGN PATENT DOCUMENTS

| JP | 2008-058600 | 3/2008 |
| JP | 2008-233161 | 10/2008 |

* cited by examiner

*Primary Examiner* — Jordan Schwartz
(74) *Attorney, Agent, or Firm* — Rader Fishman & Grauer, PLLC

(57) ABSTRACT

A zoom lens includes, in order from an object side to an image side: first, second and third lens groups having a negative refractive power, a positive refractive power and a positive refractive power, respectively. The first lens group includes a single compound aspheric lens formed of a spherical glass lens having a negative refractive power and a resin lens having a positive refractive power and an image side surface thereof is aspheric, and the conditional expressions (1) to (4) are satisfied $$f11/fw < -1.8, \quad (1)$$
$$1.55 < n11, \quad (2)$$
$$55 < v11, \text{ and} \quad (3)$$
$$G1r1 < -16.5, \quad (4)$$

where
f11 and fw are focal lengths of the spherical glass lens and the whole lens system at a wide-angle end, respectively, n11 and v11 are a refractive index and an Abbe number, respectively, of the spherical glass lens at the d-line, and G1r1 is a radius of curvature of an object side surface of the spherical glass lens.

9 Claims, 13 Drawing Sheets

FIG.5
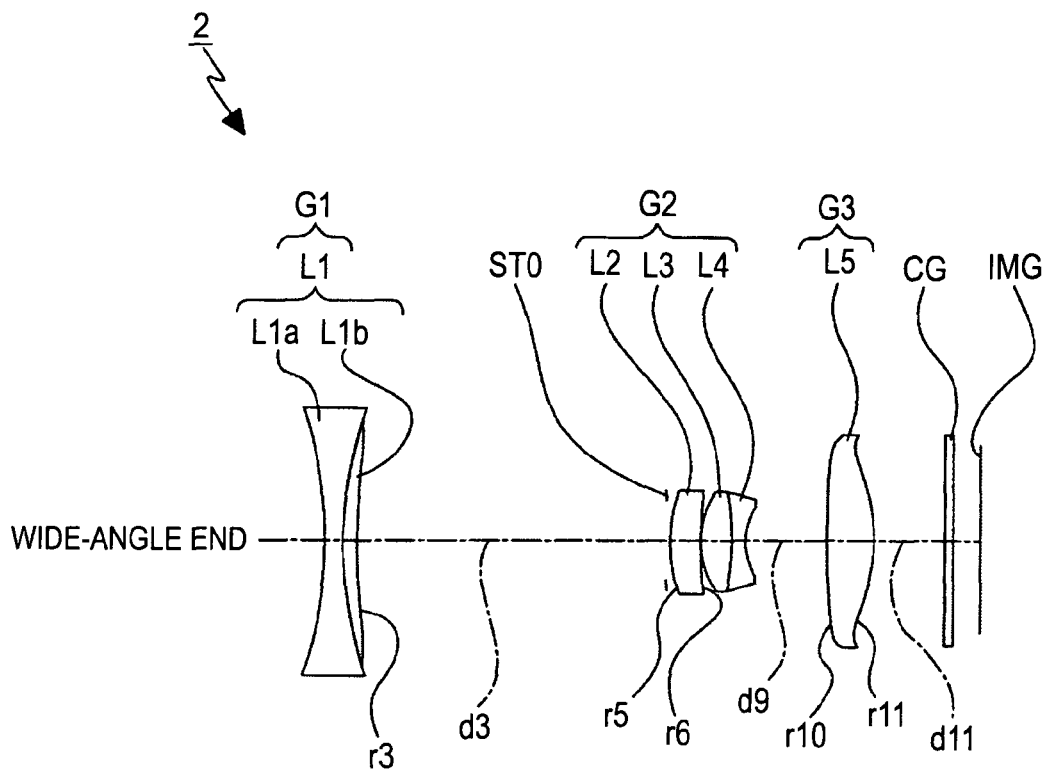
WIDE-ANGLE END
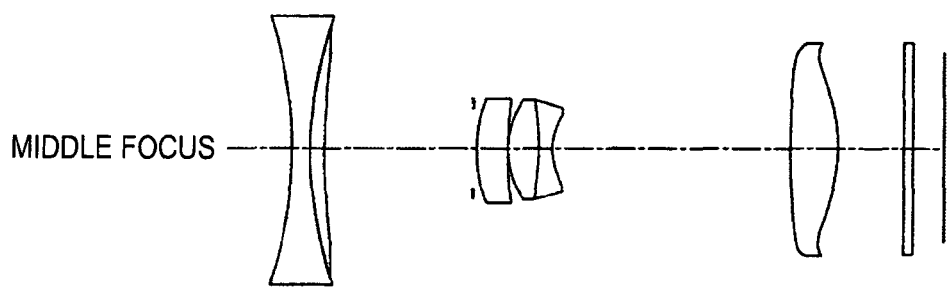
MIDDLE FOCUS
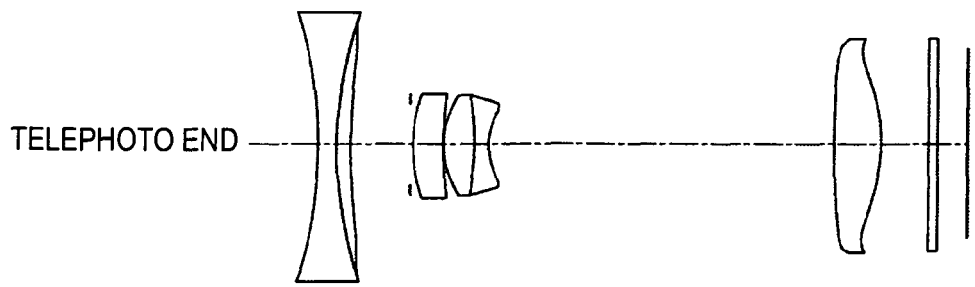
TELEPHOTO END

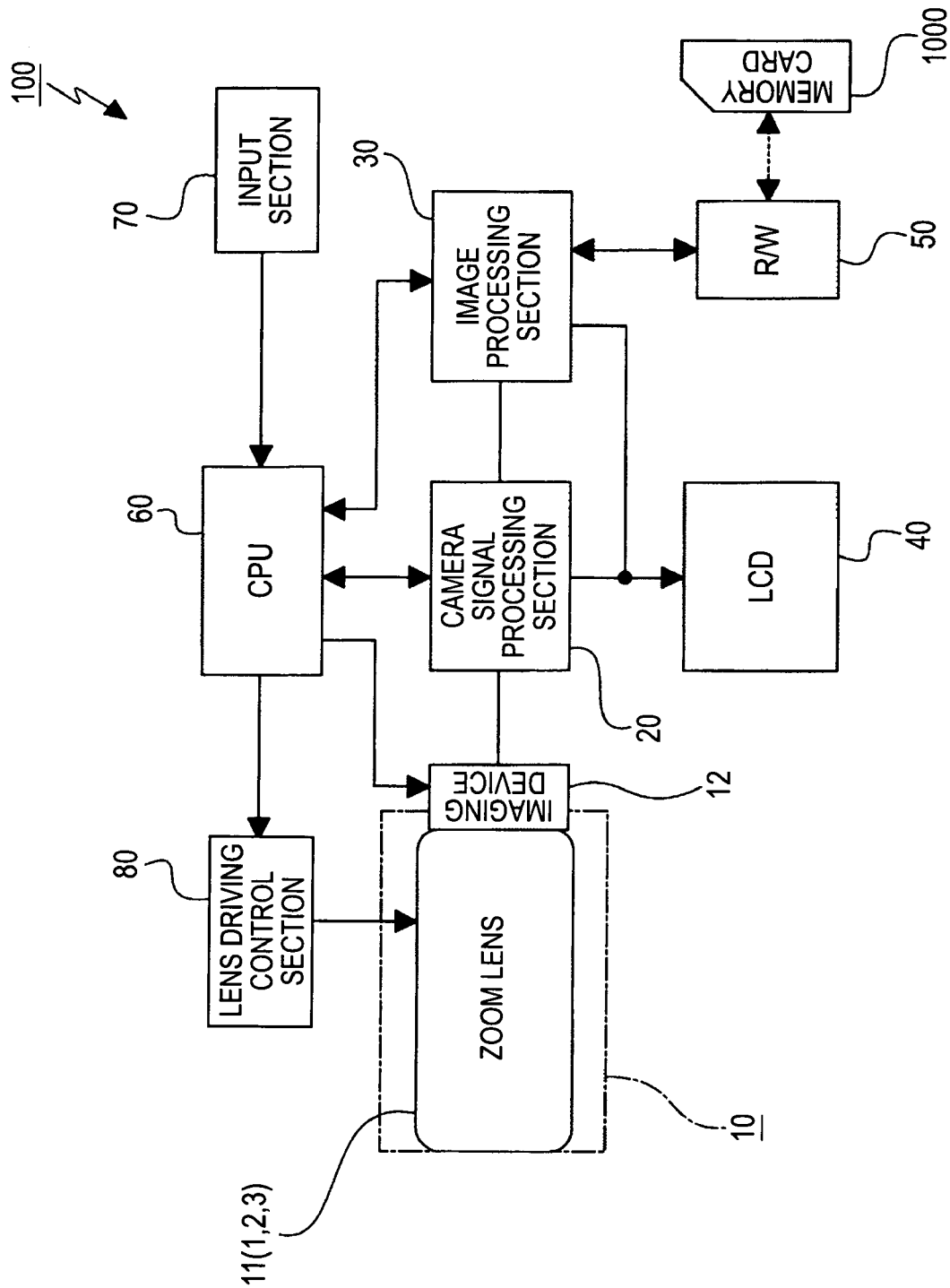

ZOOM LENS AND IMAGING APPARATUS

BACKGROUND OF THE INVENTION

1. Field of the Invention

The present invention relates to a zoom lens and an imaging apparatus. Specifically, the invention relates to the technical field of the zoom lens and the imaging apparatus capable of achieving reduction in size and cost by being appropriately used in electronic cameras such as video cameras and still cameras.

2. Description of the Related Art

Recently, digital video cameras, digital still cameras, and the like using a solid-state imaging device such as CCD (Charge Coupled Device) or CMOS (Complementary Metal-Oxide Semiconductor) have spread rapidly. As the digital cameras and the like have come into widespread use, users' demands to reduce price (cost) and size and increase performance have increased.

In order to cope with the demands, some zoom lenses have a three-group configuration of negative, positive, and positive groups in which the first lens group includes a single compound aspheric lens formed of a glass lens and a resin lens having aspheric shapes.

JP-A-2008-233161 and JP-A-2008-58600 are examples of the related art.

SUMMARY OF THE INVENTION

In the zoom lenses disclosed in JP-A-2008-233161 and JP-A-2008-58600, it is possible to achieve reduction in size by using the compound aspheric lens, but it is necessary to form an aspheric surface on the glass lens constituting the compound aspheric lens. For this reason, it is difficult to sufficiently reduce the cost.

Accordingly, it is desirable to provide a zoom lens and an imaging apparatus which achieve reduction in size and cost without the problem.

According to one embodiment of the invention, there is provided a zoom lens including, in order from an object side to an image side: a first lens group which has a negative refractive power; a second lens group which has a positive refractive power; and a third lens group which has a positive refractive power. The first lens group includes a single compound aspheric lens formed of a spherical glass lens which has a negative refractive power and a resin lens which has a positive refractive power and whose image side surface is formed to be aspheric. With such a configuration, the following conditional expressions (1) to (4) are satisfied.

$$f11/fw < -1.8, \tag{1}$$

$$1.55 < n11, \tag{2}$$

$$55 < v11, \text{ and} \tag{3}$$

$$G1r1 < -16.5, \tag{4}$$

where f11 is the focal length of the spherical glass lens in the first lens group, fw is the focal length of the whole lens system at a wide-angle end, n11 is the refractive index of the spherical glass lens in the first lens group at the d-line, v11 is the Abbe number of the spherical glass lens in the first lens group at the d-line, and G1r1 is the radius of curvature of the object side surface of the spherical glass lens in the first lens group.

Accordingly, in the zoom lens according to the first embodiment, it is possible to correct chromatic aberration by using the spherical glass lens, which has a negative refractive power, and the resin lens, which has a positive refractive power and whose surface is formed to be aspheric, in the first lens group.

In the zoom lens according to the first embodiment, it is preferable to satisfy the following conditional expression (5).

$$0.4 < d12 < 0.9, \tag{5}$$

where d12 is the center thickness of the resin lens in the first lens group.

By making the zoom lens according to the first embodiment satisfy the conditional expression (5), it is possible to reduce the thickness of the resin lens.

In the zoom lens according to the first embodiment, it is preferable to satisfy the following conditional expression (6).

$$hn < 5, \tag{6}$$

where hn is the thickness deviation ratio of the resin lens in the first lens group.

By making the zoom lens according to the first embodiment satisfy the conditional expression (6), it is possible to prevent the ratio of the center portion to the peripheral portion of the resin lens from increasing.

In the zoom lens according to the first embodiment, it is preferable to satisfy the following conditional expressions (7) and (8).

$$d/fw < 0.35, \text{ and} \tag{7}$$

$$f11/f12 > -0.5, \tag{8}$$

where d is the center thickness of the first lens group, and f12 is the focal length of the resin lens in the first lens group.

By making the zoom lens according to the first embodiment satisfy the conditional expressions (7) and (8), it is possible to prevent the focal length of the first lens group at the wide-angle end from becoming short relative to the thickness of the first lens group. In addition, it is also possible to prevent the refractive power of the resin lens from becoming much larger than that of the spherical glass lens.

In the zoom lens according to the first embodiment, it is preferable that the second lens group should include, in order from the object side to the image side: a single lens which has a positive refractive power and whose convex surface faces toward the object side; and a cemented lens which has a negative refractive power and is formed by cementing a positive lens and a negative lens. In addition, it is also preferable to satisfy the following conditional expression (9).

$$f21/f2 < 3.5, \tag{9}$$

where f21 is the focal length of the single lens, which has the positive refractive power, in the second lens group, and f2 is the focal length of the second lens group.

In the zoom lens according to this embodiment of the invention, by adopting the above-mentioned configuration and satisfying the conditional expression (9), it is possible to prevent the refractive power of the single lens, which has a positive refractive power, from becoming much smaller than that of the second lens group.

In the zoom lens according to this embodiment of the invention, it is preferable that the object side surface of the spherical glass lens in the first lens group should be formed to be concave toward the object side. In addition, it is also preferable to satisfy the following conditional expressions (10) to (12).

$$0.05 < |sg(3a)/sg(3s)|, \quad (10)$$

$$n12 > 1.5, \text{ and} \quad (11)$$

$$v12 < 30, \quad (12)$$

where sg(3a) is the aspheric sag amount of the surface of the compound aspheric lens closest to the image side in the first lens group at the effective diameter position thereof, sg(3s) is the spherical sag amount of the surface of the compound aspheric lens closest to the image side in the first lens group at the effective diameter position thereof, n12 is the refractive index of the resin lens in the first lens group at the d-line, and v12 is the Abbe number of the resin lens in the first lens group at the d-line.

In the zoom lens according to this embodiment of the invention, by adopting the above-mentioned configuration and satisfying the conditional expressions (10) to (12), it is possible to sufficiently correct spherical aberration, distortion, image field curvature, and chromatic aberration.

According to another embodiment of the invention, there is provided an imaging apparatus including: a zoom lens; and an imaging device that converts an optical image, which is formed by the zoom lens, into an electric signal. The zoom lens includes, in order from the object side to the image side: a first lens group which has a negative refractive power; a second lens group which has a positive refractive power; and a third lens group which has a positive refractive power. The first lens group includes a single compound aspheric lens formed of a spherical glass lens which has a negative refractive power and a resin lens which has a positive refractive power and whose image side surface is formed to be aspheric. With such a configuration, the following conditional expressions (1) to (4) are satisfied.

$$f11/fw < -1.8, \quad (1)$$

$$1.55 < n11, \quad (2)$$

$$55 < v11, \text{ and} \quad (3)$$

$$G1r1 < -16.5, \quad (4)$$

where f11 is the focal length of the spherical glass lens in the first lens group, fw is the focal length of the whole lens system at a wide-angle end, n11 is the refractive index of the spherical glass lens in the first lens group at the d-line, v11 is the Abbe number of the spherical glass lens in the first lens group at the d-line, and G1r1 is the radius of curvature of the object side surface of the spherical glass lens in the first lens group.

Accordingly, in the imaging apparatus according to the second embodiment, it is possible to correct chromatic aberration by using the spherical glass lens, which has a negative refractive power, and the resin lens, which has a positive refractive power and whose surface is formed to be aspheric, in the first lens group.

In the one embodiment of the invention, the zoom lens includes, in order from the object side to the image side: the first lens group which has a negative refractive power; the second lens group which has a positive refractive power; and the third lens group which has a positive refractive power. The first lens group includes a single compound aspheric lens formed of the spherical glass lens which has a negative refractive power and the resin lens which has a positive refractive power and whose image side surface is formed to be aspheric. With such a configuration, the following conditional expressions (1) to (4) are satisfied.

$$f11/fw < -1.8, \quad (1)$$

$$1.55 < n11, \quad (2)$$

$$55 < v11, \text{ and} \quad (3)$$

$$G1r1 < -16.5, \quad (4)$$

where f11 is the focal length of the spherical glass lens in the first lens group, fw is the focal length of the whole lens system at a wide-angle end, n11 is the refractive index of the spherical glass lens in the first lens group at the d-line, v11 is the Abbe number of the spherical glass lens in the first lens group at the d-line, and G1r1 is the radius of curvature of the object side surface of the spherical glass lens in the first lens group.

Accordingly, it is possible to achieve reduction in size and cost.

In the one embodiment of the invention, the zoom lens is configured to satisfy the following conditional expression (5).

$$0.4 < d12 < 0.9, \quad (5)$$

where d12 is the center thickness of the resin lens in the first lens group.

Accordingly, it is possible to reduce the time of molding the resin lens and reduce the level of difficulty in molding the resin lens.

In the one embodiment of the invention, the zoom lens is configured to satisfy the following conditional expression (6).

$$hn < 5, \quad (6)$$

where hn is the thickness deviation ratio of the resin lens in the first lens group.

Accordingly, it is possible to reduce the level of difficulty in molding the resin lens.

In the one embodiment of the invention, the zoom lens is configured to satisfy the conditional expressions (7) and (8)

$$d/fw < 0.35, \text{ and} \quad (7)$$

$$f11/f12 > -0.5, \quad (8)$$

where d is the center thickness of the first lens group, and f12 is the focal length of the resin lens in the first lens group.

Accordingly, it is possible to improve performance thereof in the peripheral portion at the wide-angle end as well as image quality.

In the one embodiment of the invention, the second lens group includes, in order from the object side to the image side: the single lens which has a positive refractive power and whose convex surface faces toward the object side; and the cemented lens which has a negative refractive power and is formed by cementing the positive lens and the negative lens. In addition, the zoom lens is configured to satisfy the following conditional expression (9).

$$f21/f2 < 3.5, \quad (9)$$

where f21 is the focal length of the single lens, which has the positive refractive power, in the second lens group, and f2 is the focal length of the second lens group.

Accordingly, it is possible to reduce the manufacturing cost and satisfactorily correct chromatic aberration.

In the one embodiment of the invention, the object side surface of the spherical glass lens in the first lens group is formed to be concave toward the object side. In addition, the zoom lens is configured to satisfy the following conditional expressions (10) to (12).

$$0.05 < |sg(3a)/sg(3s)|, \quad (10)$$

$$n12 > 1.5, \text{ and} \quad (11)$$

$$v12 < 30, \quad (12)$$

where sg(3a) is the aspheric sag amount of the surface of the compound aspheric lens closest to the image side in the first lens group at the effective diameter position thereof, sg(3s) is the spherical sag amount of the surface of the compound aspheric lens closest to the image side in the first lens group at the effective diameter position thereof, n12 is the refractive index of the resin lens in the first lens group at the d-line, and v12 is the Abbe number of the resin lens in the first lens group at the d-line.

Accordingly, it is possible to improve performance and image quality.

In the another embodiment of the invention, the imaging apparatus includes: the zoom lens; and the imaging device that converts an optical image, which is formed by the zoom lens, into an electric signal. The zoom lens includes, in order from the object side to the image side: the first lens group which has a negative refractive power; the second lens group which has a positive refractive power; and the third lens group which has a positive refractive power. The first lens group includes a single compound aspheric lens formed of the spherical glass lens which has a negative refractive power and the resin lens which has a positive refractive power and whose image side surface is formed to be aspheric. With such a configuration, the following conditional expressions (1) to (4) are satisfied.

$$f11/fw < -1.8, \quad (1)$$

$$1.55 < n11, \quad (2)$$

$$55 < v11, \text{ and} \quad (3)$$

$$G1r1 < -16.5, \quad (4)$$

where f11 is the focal length of the spherical glass lens in the first lens group, fw is the focal length of the whole lens system at a wide-angle end, n11 is the refractive index of the spherical glass lens in the first lens group at the d-line, v11 is the Abbe number of the spherical glass lens in the first lens group at the d-line, and G1r1 is the radius of curvature of the object side surface of the spherical glass lens in the first lens group.

Accordingly, it is possible to achieve reduction in size and cost.

BRIEF DESCRIPTION OF THE DRAWINGS

FIG. 5 is a diagram illustrating a lens configuration of a zoom lens according to a second embodiment of the invention;

FIG. 13 is a block diagram illustrating an imaging apparatus according to an embodiment of the invention.

DESCRIPTION OF THE PREFERRED EMBODIMENTS

Figure 1:
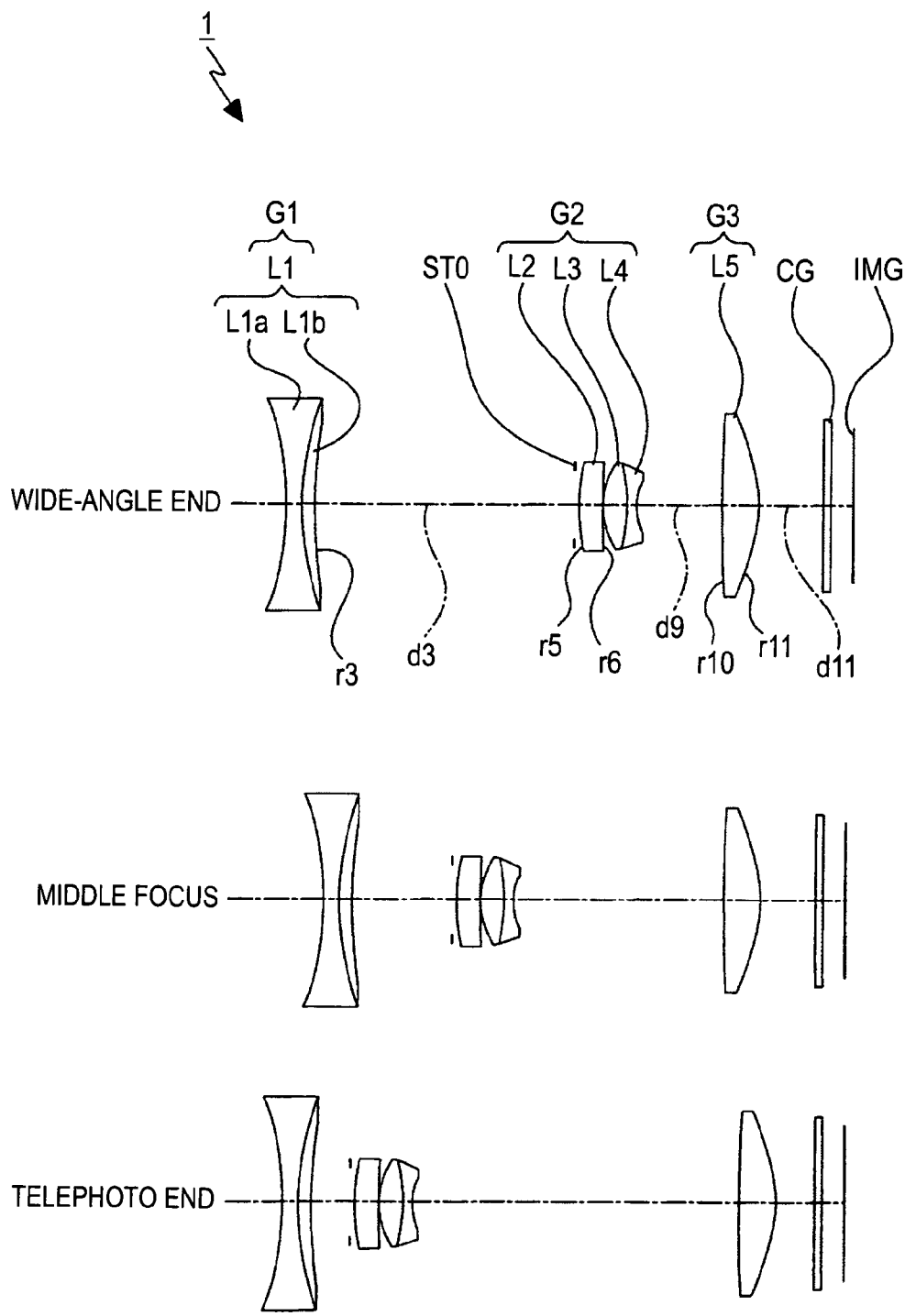
FIG. 1 is a diagram illustrating a lens configuration of a zoom lens according to a first embodiment of the invention.

Hereinafter, the zoom lens and the imaging apparatus according to preferred embodiments of the invention will be described.

[Configuration of Zoom Lens]

A zoom lens according to an embodiment of the invention includes, in order from the object side to the image side: a first lens group which has a negative refractive power; a second lens group which has a positive refractive power; and a third lens group which has a positive refractive power.

The zoom lens according to the embodiment of the invention is configured so that the first lens group includes a single compound aspheric lens formed of a spherical glass lens which has a negative refractive power and a resin lens which has a positive refractive power and whose image side surface is formed to be aspheric.

In the zoom lens according to the embodiment of the invention, as described above, by adopting the configuration in which the first lens group includes the single compound aspheric lens formed of the spherical glass lens which has a negative refractive power and the resin lens which has a positive refractive power and whose image side surface is formed to be aspheric, the following effects can be obtained.

Since the first lens group is not configured to include a plurality of lenses but configured to include a single lens, there is no deterioration in performance caused by eccentricity between the lenses of the first lens group. Hence, it is not necessary to adjust the centers of the lenses of the first lens group, and it is possible to reduce the manufacturing time. Consequently, as compared with the case where the first lens group is configured to include a plurality of lenses, it is possible to achieve high performance and reduction in cost and thickness (size).

Further, generally, it has been known that, as the position through which rays pass is farther away from the optical axis, the effect of the aspheric surface of the aspheric lens is larger. In the zoom lens having the three-group configuration of negative, positive, and positive groups, the position through which rays pass in the first lens group is far away from the optical axis, in particular, as compared with other lens groups at the wide-angle end.

Accordingly, by forming an aspheric surface in the first lens group, it is possible to effectively improve performance in the peripheral portion of the screen at the wide-angle end. Further, particularly, by forming an aspheric surface, on the resin lens, even when the glass lens is spherical, it is possible to sufficiently improve performance, and thus it is possible to reduce the manufacturing cost.

Moreover, in the first lens group which has a negative refractive power, the refractive power of the positive lens is smaller than the refractive power of the negative lens. Further, generally, change in performance of the resin lens at the time of change in temperature and humidity is larger than that of the glass lens. Accordingly, it is necessary to suppress deterioration in performance at the time of the change in temperature and humidity. Hence, it is difficult to increase the refractive power of the resin lens.

Accordingly, in the same manner as the zoom lens according to the embodiment of the invention, by adopting the configuration in which the spherical glass lens has a negative refractive power and the resin lens has a positive refractive power, it is possible to achieve an increase in performance due to the effect of the aspheric surface while suppressing deterioration in performance at the time of change in temperature and humidity.

In addition, in the zoom lens according to the embodiment of the invention, by appropriately setting the refractive powers and the Abbe numbers of the negative lens (the spherical glass lens) and the positive lens (the resin lens) of the first lens group as represented by the following conditional expressions (1) to (4), it is possible to effectively correct longitudinal chromatic aberration at the telephoto end.

Further, by using the zoom lens according to the embodiment of the invention, it is possible to embody an imaging optical system whose wide-angle end is about 28 to 38 mm (35 mm film conversion) and the zoom ratio is 2.4 to 3.7 times.

The zoom lens according to the embodiment of the invention is configured to satisfy the following conditional expressions (1) to (4).

$$f11/fw < -1.8, \quad (1)$$

$$1.55 < n11, \quad (2)$$

$$55 < v11, \text{ and} \quad (3)$$

$$G1r1 < -16.5, \quad (4)$$

where
f11 is the focal length of the spherical glass lens in the first lens group,
fw is the focal length of the whole lens system at a wide-angle end,
n11 is the refractive index of the spherical glass lens in the first lens group at the d-line,
v11 is the Abbe number of the spherical glass lens in the first lens group at the d-line, and
G1r1 is the radius of curvature of the object side surface of the spherical glass lens in the first lens group.

In the zoom lens according to the embodiment of the invention, by adopting the above-mentioned configuration and satisfying the conditional expressions (1) to (4), it is possible to achieve reduction in size, an increase in performance, and reduction in cost.

The conditional expression (1) defines the ratio of the focal length of the spherical glass lens in the first lens group to the focal length of the whole lens system at the wide-angle end.

When the upper limit of the conditional expression (1) is exceeded, this is advantageous in reduction in size, but the focal length of the first lens group becomes much shorter than the focal length at the wide-angle end (the refractive power of the first lens group becomes too large). Hence, the error sensitivity of a single lens element increases. Further, performance thereof is deteriorated by occurrence of spherical aberration, longitudinal chromatic aberration, and the like.

Accordingly, by making the zoom lens satisfy conditional expression (1), it is possible to reduce the error sensitivity of the single lens element and improve performance thereof.

The conditional expression (2) defines the refractive index of the spherical glass lens in the first lens group.

When the lower limit of the conditional expression (2) is exceeded, the refractive index of the spherical glass lens becomes too small, and thus the radius of curvature thereof becomes too small when the refractive power necessary for the spherical glass lens is intended to be applied. For this reason, performance thereof is deteriorated by occurrence of spherical aberration, image field curvature, distortion, and the like.

Accordingly, by making the zoom lens satisfy the conditional expression (2), it is possible to apply the refractive power necessary for the spherical glass lens without deteriorating performance thereof.

The conditional expression (3) defines the Abbe number of the spherical glass lens in the first lens group.

When the lower limit of the conditional expression (3) is exceeded, it is difficult to sufficiently correct longitudinal chromatic aberration caused in the spherical glass lens of the first lens group by employing the resin lens. In particular, performance thereof at the telephoto end is deteriorated.

Accordingly, by making the zoom lens satisfy the conditional expression (3), it is possible to satisfactorily correct longitudinal chromatic aberration caused in the spherical glass lens of the first lens group by employing the resin lens.

The conditional expression (4) defines the radius of curvature of the object side surface of the spherical glass lens in the first lens group.

When the upper limit of the conditional expression (4) is exceeded, it is difficult to sufficiently correct distortion caused particularly in the object side surface of the spherical glass lens in the first lens group. In particular, performance thereof in the peripheral portion of the screen at the wide-angle end is deteriorated.

Accordingly, by making the zoom lens satisfy the conditional expression (4), it is possible to satisfactorily correct distortion caused in the spherical glass lens of the first lens group.

In the zoom lens according to the embodiment of the invention, all the lens groups of the first lens group, the second lens group, and the third lens group are configured to be movable in the direction of the optical axis.

On the wide-angle side (short focus), by widening the space between the first lens group and the second lens group and reducing the space between the second lens group and the image plane, the principal point is set to be close to the image plane, and thereby the focal length becomes short.

On the telephoto side (long focus), by reducing the space between the first lens group and the second lens group and widening the space between the second lens group and the image plane, the principal point is set to be far from the image plane, and thereby the focal length becomes long.

Further, by making the third lens group movable in the direction of the optical axis, fluctuation in position of the focus at the respective angles of view is absorbed in the third lens group. In such a manner, it is possible to secure reduction in size and an increase in performance.

In the zoom lens according to the embodiment of the invention, it is preferable to satisfy the following conditional expression (5).

$$0.4 < d12 < 0.9, \tag{5}$$

where
d12 is the center thickness of the resin lens in the first lens group.

The conditional expression (5) defines the range of the center thickness (the thickness on the optical axis) of the resin lens in the first lens group.

When the upper limit of the conditional expression (5) is exceeded, the time of molding the resin lens increases, as well as the level of difficulty in molding increases. Accordingly, this causes an increase in manufacturing cost.

In contrast, when the lower limit of the conditional expression (5) is exceeded, it is difficult to secure a thickness sufficient for the peripheral portion of the resin lens to secure an appropriate refractive power. As a result, the level of difficulty in molding the resin lens increases.

Accordingly, by making the zoom lens satisfy the conditional expression (5), it is possible to reduce the time of molding the resin lens and the level of difficulty in molding.

In the zoom lens according to the embodiment of the invention, it is preferable to satisfy the following conditional expression (6).

$$hn < 5, \tag{6}$$

where
hn is the thickness deviation ratio of the resin lens in the first lens group The conditional expression (6) defines the thickness deviation ratio of the resin lens in the first lens group. The thickness deviation ratio is defined as a ratio of the thickness of the center portion of the lens to the thickness of the peripheral portion thereof. The peripheral portion is defined as a position, through which the rays pass, at the outermost periphery of the lens. The thickness is defined as a thickness in the direction of the optical axis.

When the upper limit of the conditional expression (6) is exceeded, as the ratio of the thickness of the center portion of the resin lens to the thickness of the peripheral portion thereof excessively increases, the level of difficulty in molding increases. Thus, this causes an increase in manufacturing cost. Accordingly, by making the zoom lens satisfy the conditional expression (6), it is possible to reduce the level of difficulty in molding the resin lens.

In the zoom lens according to the embodiment of the invention, it is preferable to satisfy the following conditional expressions (7) and (8).

$$d/fw < 0.35, \text{ and} \tag{7}$$

$$f11/f12 > -0.5, \tag{8}$$

where
d is the center thickness of the first lens group, and
f12 is the focal length of the resin lens in the first lens group.

The conditional expression (7) defines the ratio of the center thickness (the thickness on the optical axis) of the first lens group to the focal length of the whole zoom lens system at the wide-angle end.

When the upper limit of the conditional expression (7) is exceeded, the focal length of the first lens group at the wide-angle end becomes too short relative to the thickness of the first lens group. For this reason, performance thereof in the peripheral portion at the wide-angle end is deteriorated.

The conditional expression (8) defines the ratio of the focal length of the spherical glass lens to the focal length of the resin lens in the first lens group.

When the lower limit of the conditional expression (8) is exceeded, the refractive power of the resin lens becomes much larger than that of the spherical glass lens. Hence, it is difficult to correct chromatic aberration, in particular, at the telephoto end. As a result, image quality is deteriorated.

Accordingly, by making the zoom lens satisfy the conditional expressions (7) and (8), it is possible to improve performance thereof in the peripheral portion at the wide-angle end as well as image quality.

In the zoom lens according to the embodiment of the invention, it is preferable that the second lens group should include, in order from the object side to the image side: a single lens which has a positive refractive power and whose convex surface faces toward the object side; and a cemented lens which has a negative refractive power and is formed by cementing a positive lens and a negative lens. In addition, it is also preferable to satisfy the following conditional expression (9).

$$f21/f2 < 3.5, \tag{9}$$

where
f21 is the focal length of the single lens, which has the positive refractive power, in the second lens group, and
f2 is the focal length of the second lens group.

The conditional expression (9) defines the ratio of the focal length of the single lens which has the positive refractive power in the second lens group to the focal length of the second lens group.

When the upper limit of the conditional expression (9) is exceeded, the refractive power of the single lens, which has the positive refractive power, becomes much smaller than the refractive power of the second lens group, and thus the refractive power of the cemented lens in the second lens group becomes too large. For this reason, the level of difficulty in manufacturing the cemented lens increases, and this causes an increase in manufacturing cost. Further, it is difficult to correct chromatic aberration caused in the second lens group.

Accordingly, by making the zoom lens satisfy the conditional expression (9), it is possible to satisfactorily correct chromatic aberration while reducing the manufacturing cost.

In the zoom lens according to the embodiment of the invention, it is preferable that the object side surface of the spherical glass lens in the first lens group should be formed to be concave toward the object side. In addition, it is also preferable to satisfy the following conditional expressions (10) to (12).

$$0.05 < |sg(3a)/sg(3s)|, \tag{10}$$

$$n12 > 1.5, \text{ and} \tag{11}$$

$$v12 < 30, \tag{12}$$

where sg(3a) is the aspheric sag amount of the surface of the compound aspheric lens closest to the image side in the first lens group at the effective diameter position thereof, sg(3s) is the spherical sag amount of the surface of the compound aspheric lens closest to the image side in the first lens group at the effective diameter position thereof, n12 is the refractive index of the resin lens in the first lens group at the d-line, and v12 is the Abbe number of the resin lens in the first lens group at the d-line.

The conditional expression (10) defines the ratio of the aspheric sag amount to the spherical sag amount of the surface of the compound aspheric lens closest to the image side in the first lens group at the effective diameter position thereof.

When the lower limit of the conditional expression (10) is exceeded, it is difficult to sufficiently correct spherical aberration, distortion, and the like, and the sensitivity of eccentricity increases. As a result, performance thereof is deteriorated.

The conditional expression (11) defines the refractive index of the resin lens in the first lens group.

When the lower limit of the conditional expression (11) is exceeded, the refractive index of the resin lens becomes too small, and thus it is difficult to correct spherical aberration, image field curvature, and the like. As a result, image quality is deteriorated.

The conditional expression (11) defines the Abbe number of the resin lens in the first lens group.

When the upper limit of the conditional expression (12) is exceeded, it is difficult to sufficiently correct chromatic aberration caused in the spherical glass lens. Thus, image quality at the telephoto end is deteriorated by longitudinal chromatic aberration.

Accordingly, by making the zoom lens satisfy conditional expressions (10) to (12), it is possible to improve performance and image quality.

[Numerical Examples of Zoom Lens]

Hereinafter, specific examples of the zoom lens according to the embodiments of the invention and Numerical Examples of the embodiment to which numerical values are applied will be described with reference to the accompanying drawings and tables.

Further, the reference signs and the like shown in the following tables and description are defined as follows.

"i" represents the surface number, "ri" represents the radius of curvature, "di" represents the on-axis surface spacing between the i-th surface and the (i+1)th surface, "ni" represents the refractive index, "vi" represents the Abbe number, "f" represents the focal length, "Fno" represents the F number, and "ω" represents the half angle of view. Regarding the surface number, "ASP" represents that the corresponding surface is aspheric, and regarding the radius of curvature, "∞" represents that the corresponding surface is flat. Regarding the on-axis surface spacing, "variable" represents the variable space. "K" represents the conic constant, and "A", "B", "C" and "D" respectively represent the 4th-order, 6th-order, 8th-order, and 10th-order aspheric surface coefficients.

Further, the refractive index and the Abbe number are values at the d-line ($\lambda$=587.6 nm).

Some lenses used in the Numerical Example are configured so that the lens surface is formed to be aspheric. Here, it is assumed that "x" is the distance (the sag amount) from the vertex of the lens surface in the direction of the optical axis, "y" is the height (the image height) in the direction perpendicular to the direction of the optical axis, "c" is the paraxial radius of curvature (the inverse of the radius of curvature) at the vertex of the lens, "K" is the conic constant, and "A", "B", "C", and "D" are respectively the 4th-order, 6th-order, 8th-order, and 10th-order aspheric surface coefficients, the aspheric surface shape is defined as the following Numerical Expression 1.

$$x = cy^2/[1+\{1-(1+K)c^2y^2\}^{1/2}] + Ay^4 + By^6 + Cy^8 + Dy^{10} \quad \text{Numerical Expression 1}$$

The zoom lens according to the embodiments of the invention includes, in order from the object side to the image side: the first lens group which has a negative refractive power; the second lens group which has a positive refractive power; and the third lens group which has a positive refractive power.

In the embodiments, the first lens group includes a single compound aspheric lens formed of a spherical glass lens which has a negative refractive power and a resin lens which has a positive refractive power and whose image side surface is formed to be aspheric.

First Embodiment

FIG. 1 shows a lens configuration of a zoom lens 1 according to a first embodiment of the invention.

The zoom lens 1 includes, in order from the object side to the image side: a first lens group G1 which has a negative refractive power; a second lens group G2 which has a positive refractive power; and a third lens group G3 which has a positive refractive power.

In the zoom lens 1, the zoom ratio is set to be 2.8 times.

The first lens group G1 includes a single compound aspheric lens L1 formed of a spherical glass lens L1a which has a negative refractive power and has a biconcave shape and a resin lens L1b which has a positive refractive power and is formed on the image side surface of the spherical glass lens L1a.

The second lens group G2 includes, in order from the object side to the image side: a positive lens L2 which is a single lens having a meniscus shape and having a surface convex toward the object side; and a cemented lens which is formed of a positive lens L3 having a biconvex shape and a negative lens L4 having a biconcave shape and disposed to be close to the image side of the positive lens L3.

The third lens group G3 includes a positive lens L5 which has a biconvex shape.

An aperture diaphragm STO is disposed to be close to the object side of the second lens group G2.

A cover glass CG is disposed between the third lens group G3 and the image plane IMG.

Table 1 shows the lens data of Numerical Example 1 of the zoom lens 1, to which specific numerical values are applied, according to the first embodiment.

TABLE 1

| i | ri | di | ni | vi |
|---|---|---|---|---|
| 1 | −17.9408 | 0.800 | 1.61800 | 63.39 |
| 2 | 14.0960 | 0.750 | 1.60700 | 26.39 |
| 3 (ASP) | 31.1225 | Variable | | |
| 4 (Aperture Diaphragm) | ∞ | 0.200 | | |
| 5 (ASP) | 12.1250 | 1.300 | 1.80139 | 45.45 |
| 6 (ASP) | 93.4190 | 0.100 | | |
| 7 | 4.2240 | 1.300 | 1.83500 | 42.98 |
| 8 | −10.7010 | 0.499 | 1.71736 | 29.50 |
| 9 | 3.2084 | Variable | | |
| 10 (ASP) | 197.8580 | 1.800 | 1.52500 | 56.45 |
| 11 (ASP) | −8.7342 | Variable | | |
| 12 | ∞ | 0.300 | 1.56883 | 56.04 |
| 13 | ∞ | 1.100 | | |
| IMG | ∞ | 0.000 | | |

In the zoom lens 1, the image side surface (the third surface) of the resin lens L1*b* of the first lens group G1, both surfaces (the fifth surface and the sixth surface) of the positive lens L2 of the second lens group G2, and both surfaces (the tenth surface and the eleventh surface) of the positive lens L5 of the third lens group G3 are formed to be aspheric. Table 2 shows the 4th-order, 6th-order, 8th-order, and 10th-order aspheric coefficients A, B, C, and D of the aspheric surfaces in Numerical Example 1 together with the conic constant K.

In Table 2 and the respective tables showing the aspheric surface coefficients to be described later, the reference sign "E-i" represents an exponential expression having a base of 10, that is, "$10^{-i}$". For example, "0.12345E-05" represents "$0.12345 \times 10^{-5}$".

TABLE 2

| i | K | A | B | C | D |
|---|---|---|---|---|---|
| 3 | 0.00000E+00 | −1.43567E−04 | 9.00000E−06 | −4.19424E−07 | 7.24633E−09 |
| 5 | 0.00000E+00 | 7.56576E−04 | 2.19958E−04 | −3.40000E−05 | 4.00000E−06 |
| 6 | 0.00000E+00 | 1.43267E−03 | 2.49819E−04 | −3.40000E−05 | 5.00000E−06 |
| 10 | 0.00000E+00 | 3.02200E−04 | −2.20000E−05 | 1.00000E−06 | −3.97522E−09 |
| 11 | 0.00000E+00 | 1.30154E−04 | −6.10000E−05 | 2.00000E−06 | −3.29705E−08 |

Table 3 shows the F numbers Fno and the half angles of view ω in the wide-angle end state (f=6.50), the middle focal length state (f=12.30) and the telephoto end state (f=18.23) in Numerical Example 1.

TABLE 3

| | Wide-angle end | Middle focus | Telephoto end |
|---|---|---|---|
| f | 6.50 | 12.30 | 18.23 |
| Fno | 3.09 | 4.27 | 5.51 |
| ω | 28.30 | 17.51 | 12.02 |

In the zoom lens 1, during zooming between the wide-angle end state and telephoto end state, the surface spacing d3 between the first lens group G1 and the second lens group G2 (the aperture diaphragm STO), the surface spacing d9 between the second lens group G2 and the third lens group G3, and the surface spacing d11 between the third lens group G3 and the cover glass CG are varied. Table 4 shows the variable spaces of the surface spacings in the wide-angle end state (f=6.50), the middle focal length state (f=12.30) and the telephoto end state (f=18.23) in Numerical Example 1.

TABLE 4

| | Wide-angle end | Middle focus | Telephoto end |
|---|---|---|---|
| d3 | 13.510 | 4.851 | 1.839 |
| d9 | 4.372 | 9.923 | 15.055 |
| d11 | 3.513 | 2.816 | 1.840 |

Figure 2:
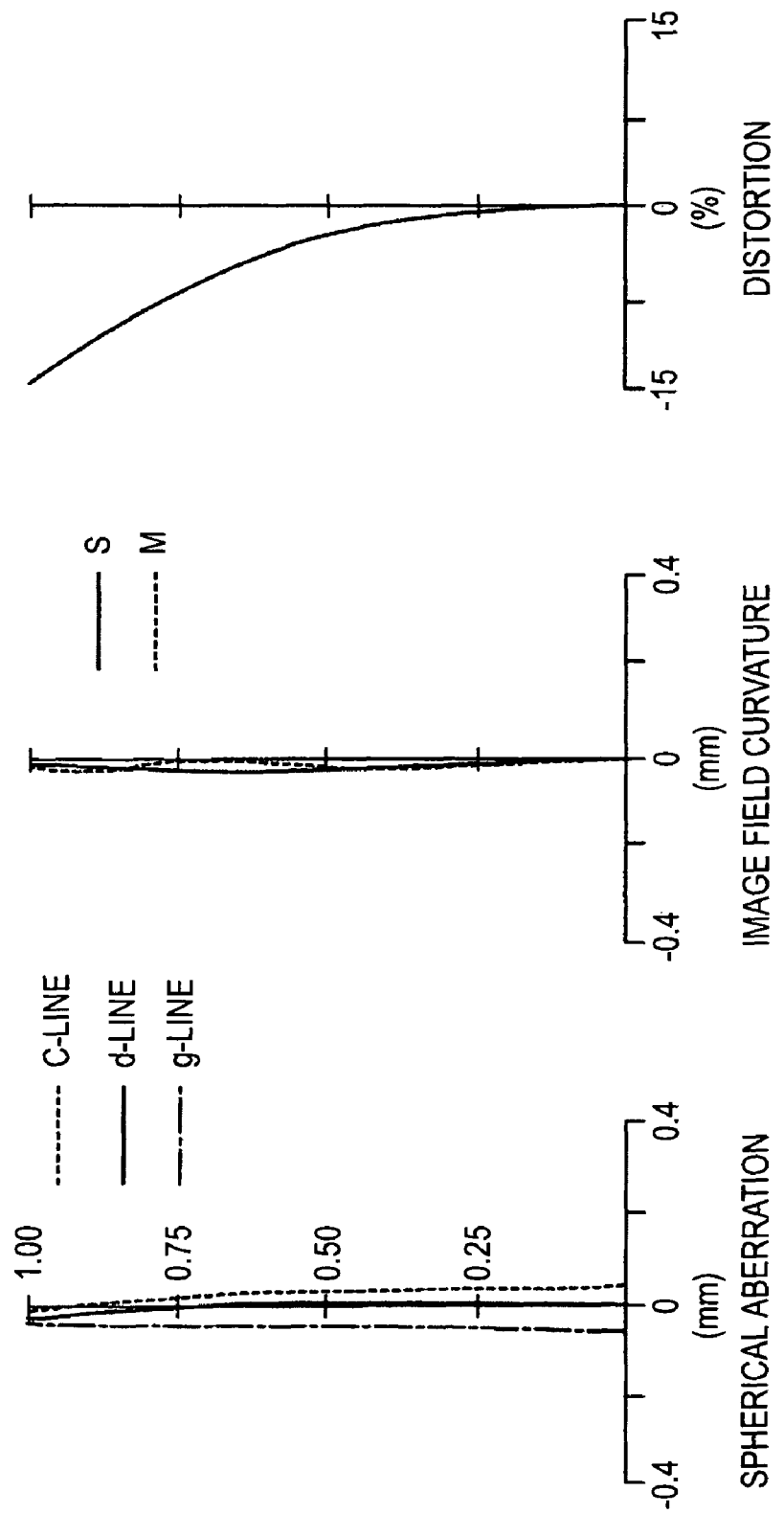
FIG. 2 is a diagram illustrating aberrations in a Numerical Example of the first embodiment to which specific numerical values are applied, together with FIGS. 3 and 4, the diagram illustrating spherical aberration, image field curvature, and distortion in the wide-angle end state.
Figure 3:
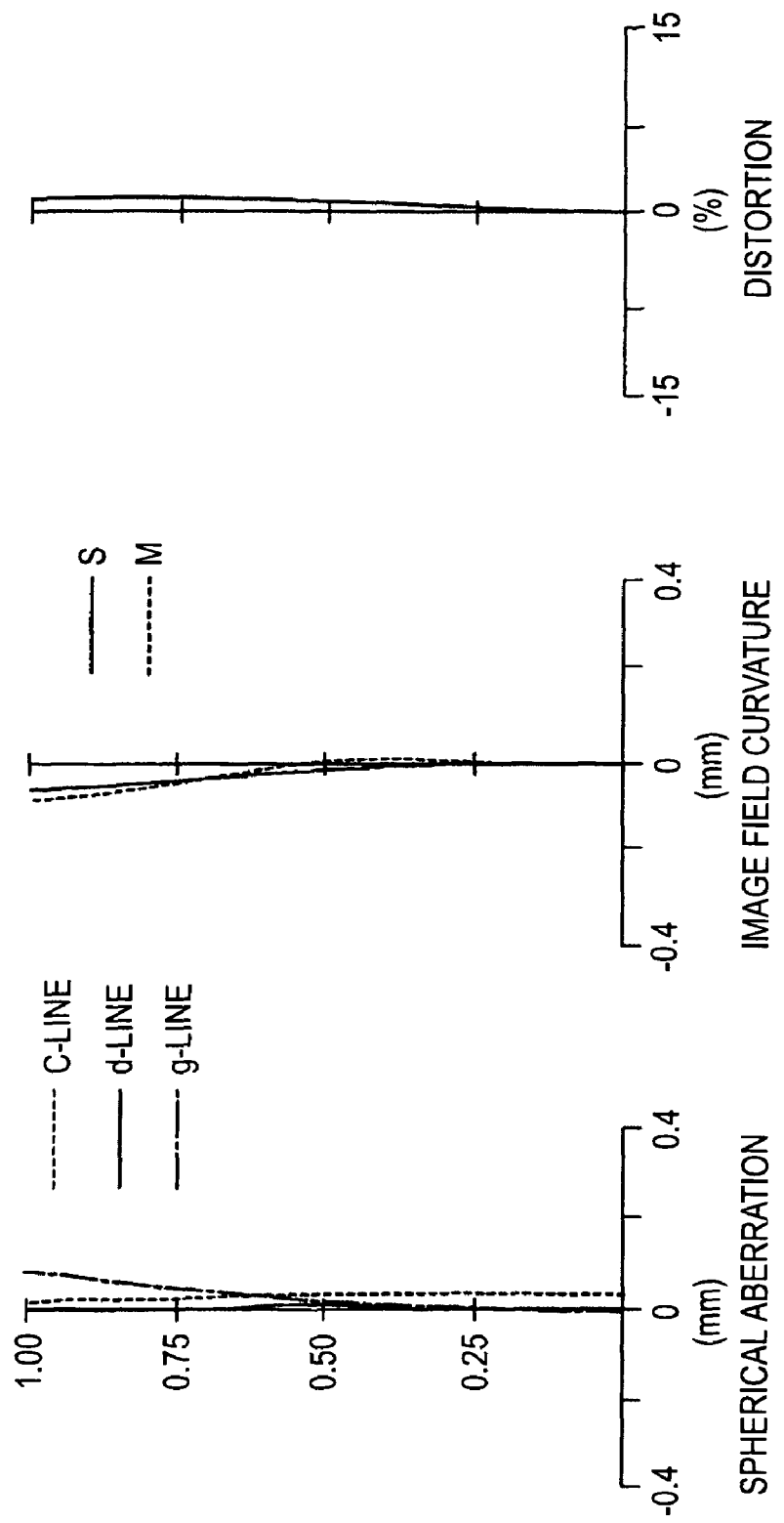
FIG. 3 is a diagram illustrating spherical aberration, image field curvature, and distortion in the middle focal length state.
Figure 4:
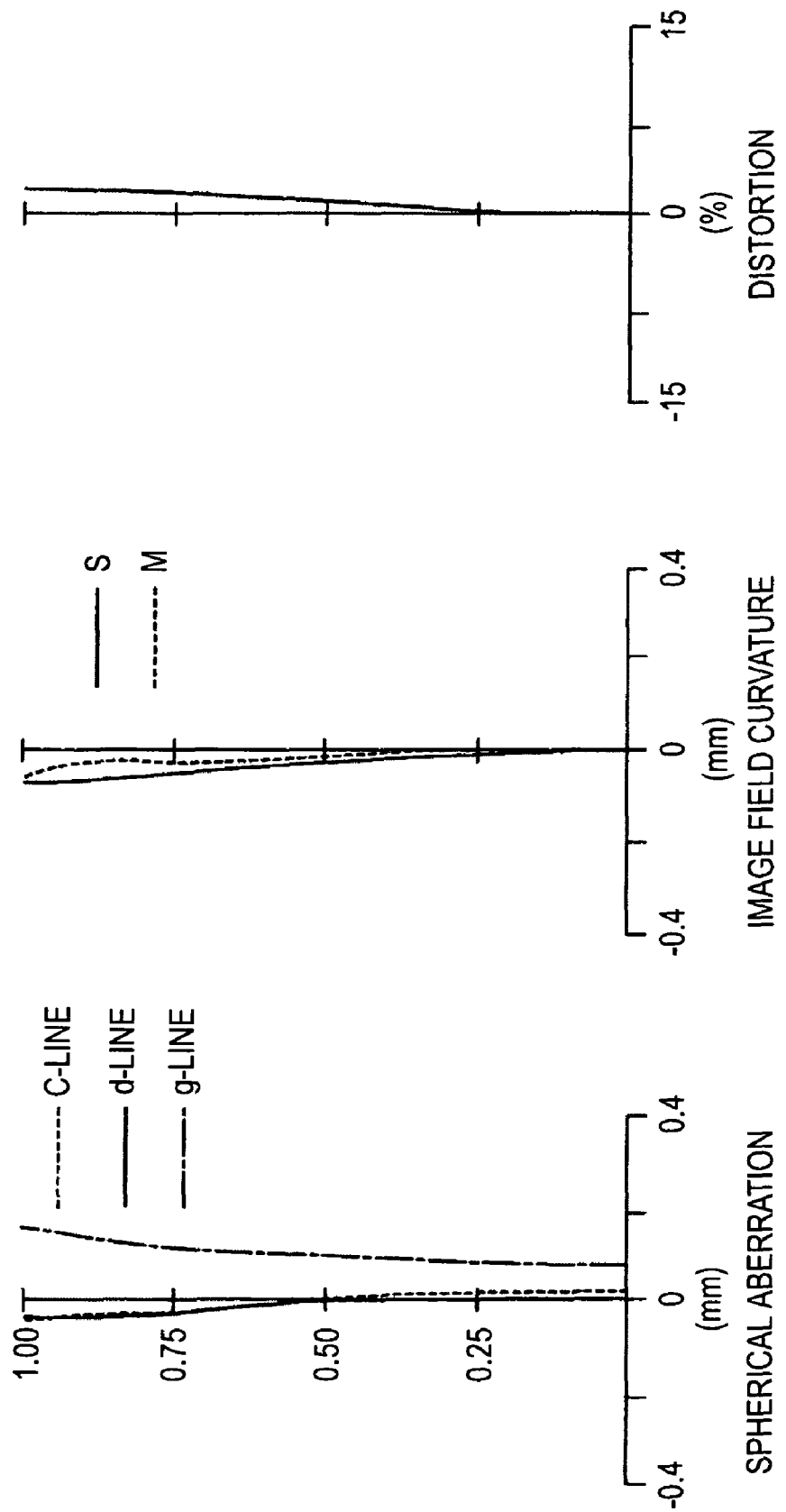
FIG. 4 is a diagram illustrating spherical aberration, image field curvature, and distortion in the telephoto end state.

FIGS. 2 to 4 show various aberrations diagrams in the infinity focus condition of Numerical Example 1. FIG. 2 shows various aberrations diagrams in the wide-angle end state (f=6.50). FIG. 3 shows various aberrations diagrams in the middle focal length state (f=12.30). FIG. 4 shows various aberrations diagrams in the telephoto end state (f=18.23).

In each spherical aberration diagram of FIGS. 2 to 4, the solid line represents the d-line (the wavelength of 587.6 nm), the chain line represents the g-line (the wavelength of 435.8 nm), and the dotted line represents the C-line (the wavelength of 656.3 nm). In each image field curvature diagram, the solid line represents a value on the sagittal image plane, and the dashed line shows a value on the meridional image plane.

As can be clearly seen from the aberration diagrams, in Numerical Example 1, it is possible to obtain an excellent imaging performance by satisfactorily correcting various aberrations.

Second Embodiment

FIG. 5 shows a lens configuration of a zoom lens 2 according to a second embodiment of the invention.

The zoom lens 2 includes, in order from the object side to the image side: a first lens group G1 which has a negative refractive power; a second lens group G2 which has a positive refractive power; and a third lens group G3 which has a positive refractive power.

In the zoom lens 2, the zoom ratio is set to be 2.8 times.

The first lens group G1 includes a single compound aspheric lens L1 formed of a spherical glass lens L1*a* which has a negative refractive power and has a biconcave shape and a resin lens L1*b* which has a positive refractive power and is formed on the image side surface of the spherical glass lens L1*a*.

The second lens group G2 includes, in order from the object side to the image side: a positive lens L2 which is a single lens having a meniscus shape and having a surface convex toward the object side; and a cemented lens which is formed of a positive lens L3 having a biconvex shape and a negative lens L4 having a biconcave shape and disposed to be close to the image side of the positive lens L3.

The third lens group G3 includes a positive lens L5 which has a biconvex shape.

An aperture diaphragm STO is disposed to be close to the object side of the second lens group G2.

A cover glass CG is disposed between the third lens group G3 and the image plane IMG.

Table 5 shows the lens data of Numerical Example 2 of the zoom lens 2, to which specific numerical values are applied, according to the second embodiment.

TABLE 5

| i | ri | di | ni | vi |
|---|---|---|---|---|
| 1 | −17.8776 | 0.800 | 1.61800 | 63.39 |
| 2 | 15.1939 | 0.620 | 1.63200 | 23.41 |
| 3 (ASP) | 26.0591 | Variable | | |
| 4 (Aperture Diaphragm) | ∞ | 0.200 | | |
| 5 (ASP) | 7.5988 | 1.300 | 1.80139 | 45.45 |
| 6 (ASP) | 13.8847 | 0.100 | | |
| 7 | 3.8247 | 1.300 | 1.83500 | 42.98 |
| 8 | −8.9461 | 0.485 | 1.71736 | 29.50 |
| 9 | 2.9996 | Variable | | |
| 10 (ASP) | 1823.0000 | 1.800 | 1.52500 | 56.45 |
| 11 (ASP) | −6.8583 | Variable | | |
| 12 | ∞ | 0.300 | 1.56883 | 56.04 |
| 13 | ∞ | 1.100 | | |
| IMG | ∞ | 0.000 | | |

In the zoom lens 2, the image side surface (the third surface) of the resin lens L1$b$ of the first lens group G1, both surfaces (the fifth surface and the sixth surface) of the positive lens L2 of the second lens group G2, and both surfaces (the tenth surface and the eleventh surface) of the positive lens L5 of the third lens group G3 are formed to be aspheric. Table 6 shows the 4th-order, 6th-order, 8th-order, and 10th-order aspheric coefficients A, B, C, and D of the aspheric surfaces in Numerical Example 2 together with the conic constant K.

TABLE 6

| i | K | A | B | C | D |
|---|---|---|---|---|---|
| 3 | 0.00000E+00 | −1.53164E−04 | 5.00000E−06 | −1.95573E−07 | 2.89583E−09 |
| 5 | 0.00000E+00 | 2.20832E−03 | 1.38971E−04 | 1.10000E−05 | −1.00000E−06 |
| 6 | 0.00000E+00 | 3.86798E−03 | 1.74521E−04 | 5.20000E−05 | −4.00000E−06 |
| 10 | 0.00000E+00 | 7.36463E−04 | −3.90000E−05 | 2.00000E−06 | 8.23315E−08 |
| 11 | 0.00000E+00 | 2.11134E−03 | −2.10000E−05 | −3.00000E−06 | 2.74391E−07 |

Table 7 shows the F numbers Fno and the half angles of view ω in the wide-angle end state (f=5.80), the middle focal length state (f=10.77) and the telephoto end state (f=16.28) in Numerical Example 2.

TABLE 7

| | Wide-angle end | Middle focus | Telephoto end |
|---|---|---|---|
| f | 5.80 | 10.77 | 16.28 |
| Fno | 3.08 | 4.25 | 5.51 |
| ω | 30.96 | 19.81 | 13.41 |

In the zoom lens 2, during zooming between the wide-angle end state and telephoto end state, the surface spacing d3 between the first lens group G1 and the second lens group G2 (the aperture diaphragm STO), the surface spacing d9 between the second lens group G2 and the third lens group G3, and the surface spacing d11 between the third lens group G3 and the cover glass CG are varied. Table 8 shows the variable spaces of the surface spacings in the wide-angle end state (f=5.80), the middle focal length state (f=10.77) and the telephoto end state (f=16.28) in Numerical Example 2.

TABLE 8

| | Wide-angle end | Middle focus | Telephoto end |
|---|---|---|---|
| d3 | 13.221 | 5.376 | 2.148 |
| d9 | 3.556 | 8.598 | 13.294 |
| d11 | 3.095 | 2.456 | 1.878 |

Figure 6:
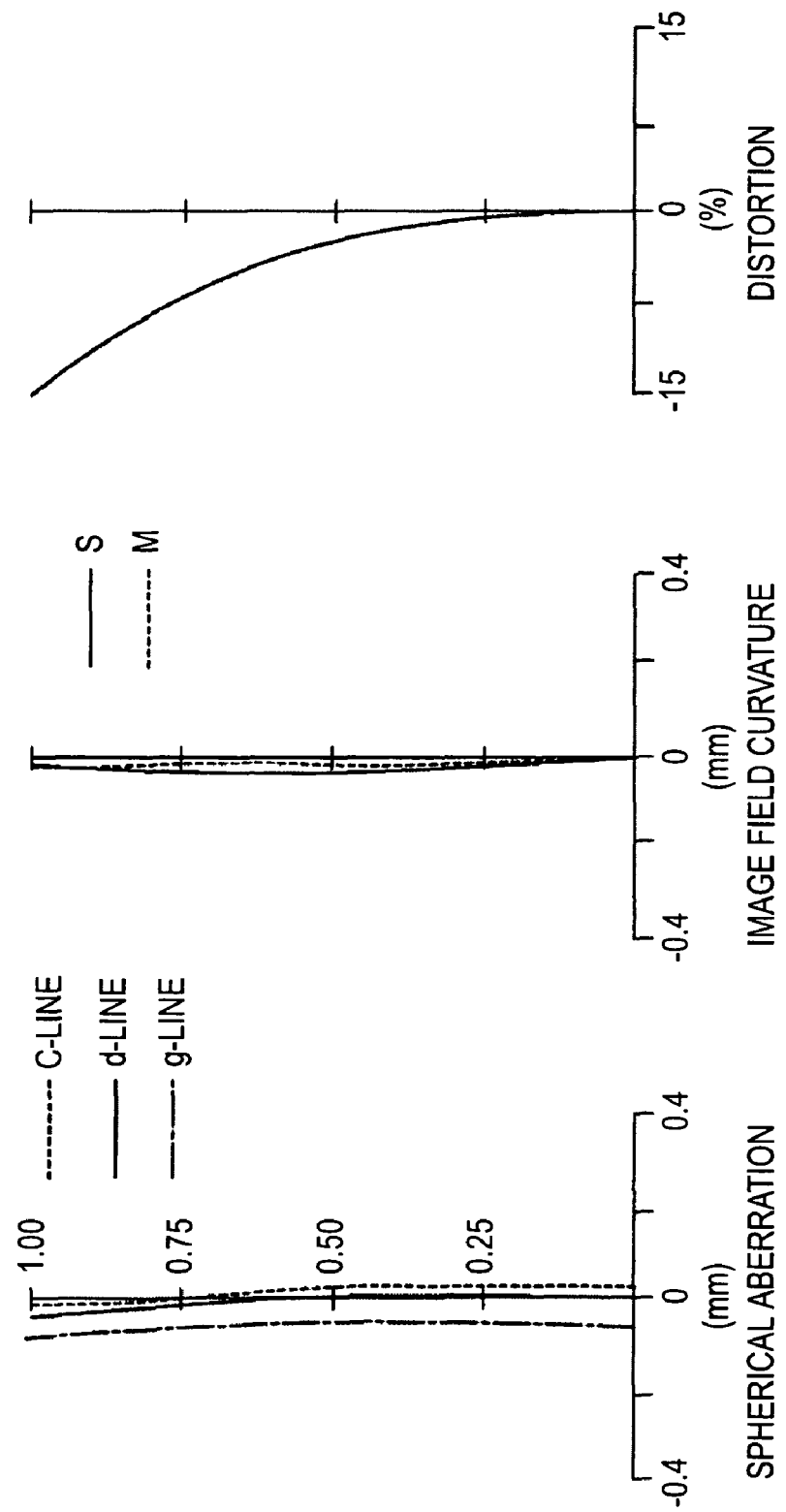
FIG. 6 is a diagram illustrating aberrations in a Numerical Example of the second embodiment to which specific numerical values are applied, together with FIGS. 7 and 8, the diagram illustrating spherical aberration, image field curvature, and distortion in the wide-angle end state.
Figure 7:
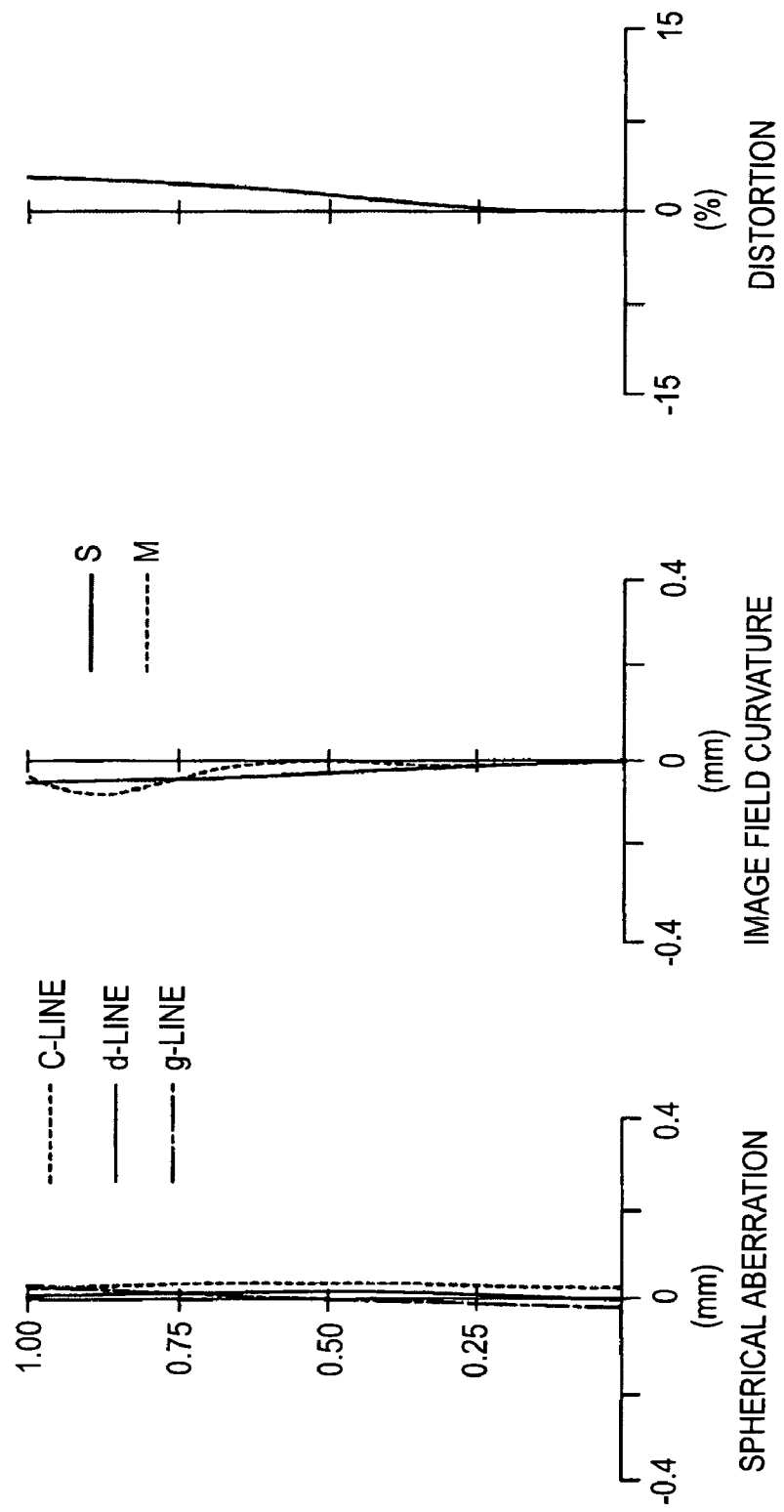
FIG. 7 is a diagram illustrating spherical aberration, image field curvature, and distortion in the middle focal length state.
Figure 8:
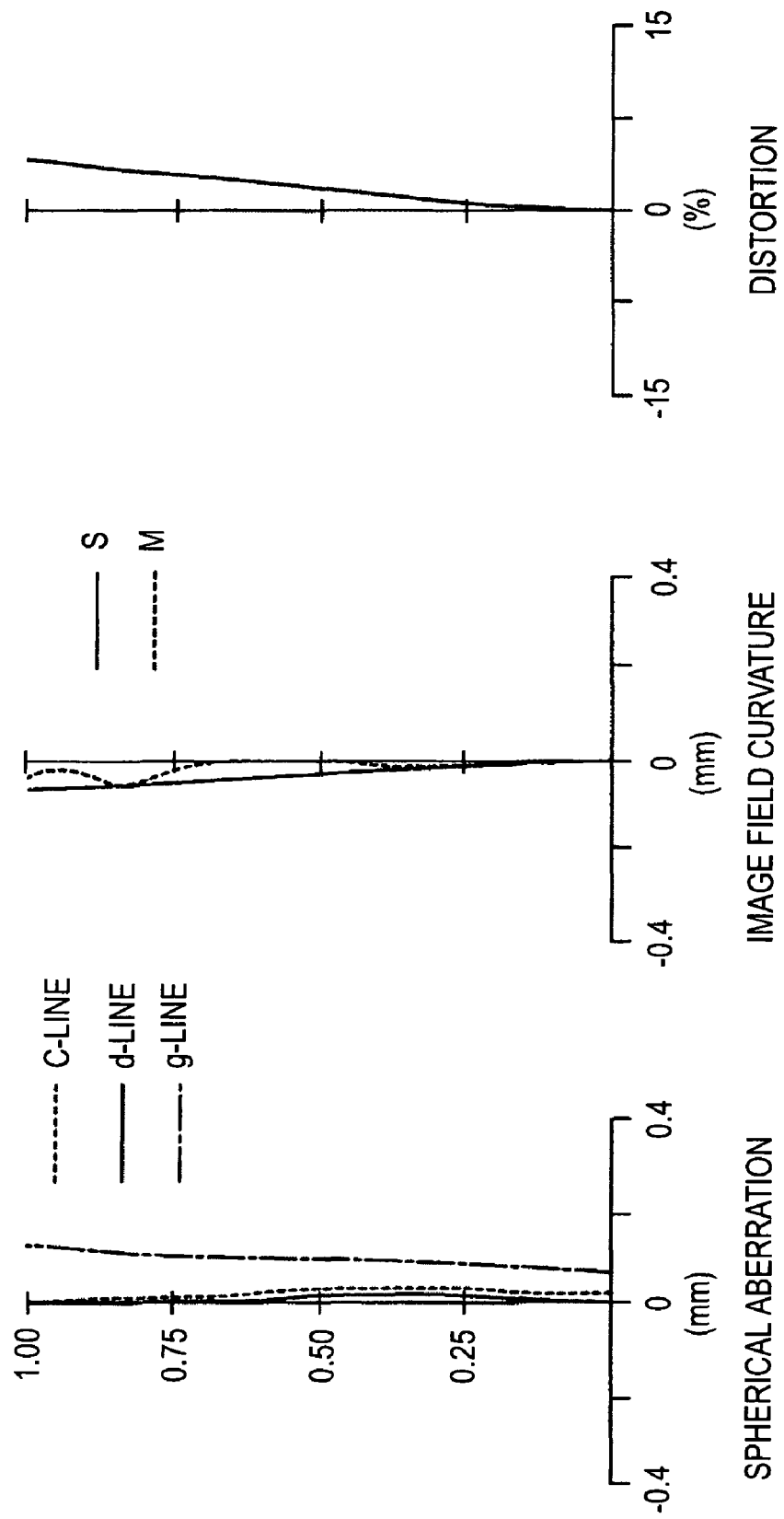
FIG. 8 is a diagram illustrating spherical aberration, image field curvature, and distortion in the telephoto end state.

FIGS. 6 to 8 show various aberrations diagrams in the infinity focus condition of Numerical Example 2. FIG. 6 shows various aberrations diagrams in the wide-angle end state (f=5.80). FIG. 7 shows various aberrations diagrams in the middle focal length state (f=10.77). FIG. 8 shows various aberrations diagrams in the telephoto end state (f=16.28).

In each spherical aberration diagram of FIGS. 6 to 8, the solid line represents the d-line (the wavelength of 587.6 nm), the chain line represents the g-line (the wavelength of 435.8 nm), and the dotted line represents the C-line (the wavelength of 656.3 nm). In each image field curvature diagram, the solid line represents a value on the sagittal image plane, and the dashed line shows a value on the meridional image plane.

As can be clearly seen from the aberration diagrams, in Numerical Example 2, it is possible to obtain an excellent imaging performance by satisfactorily correcting various aberrations.

Third Embodiment

Figure 9:
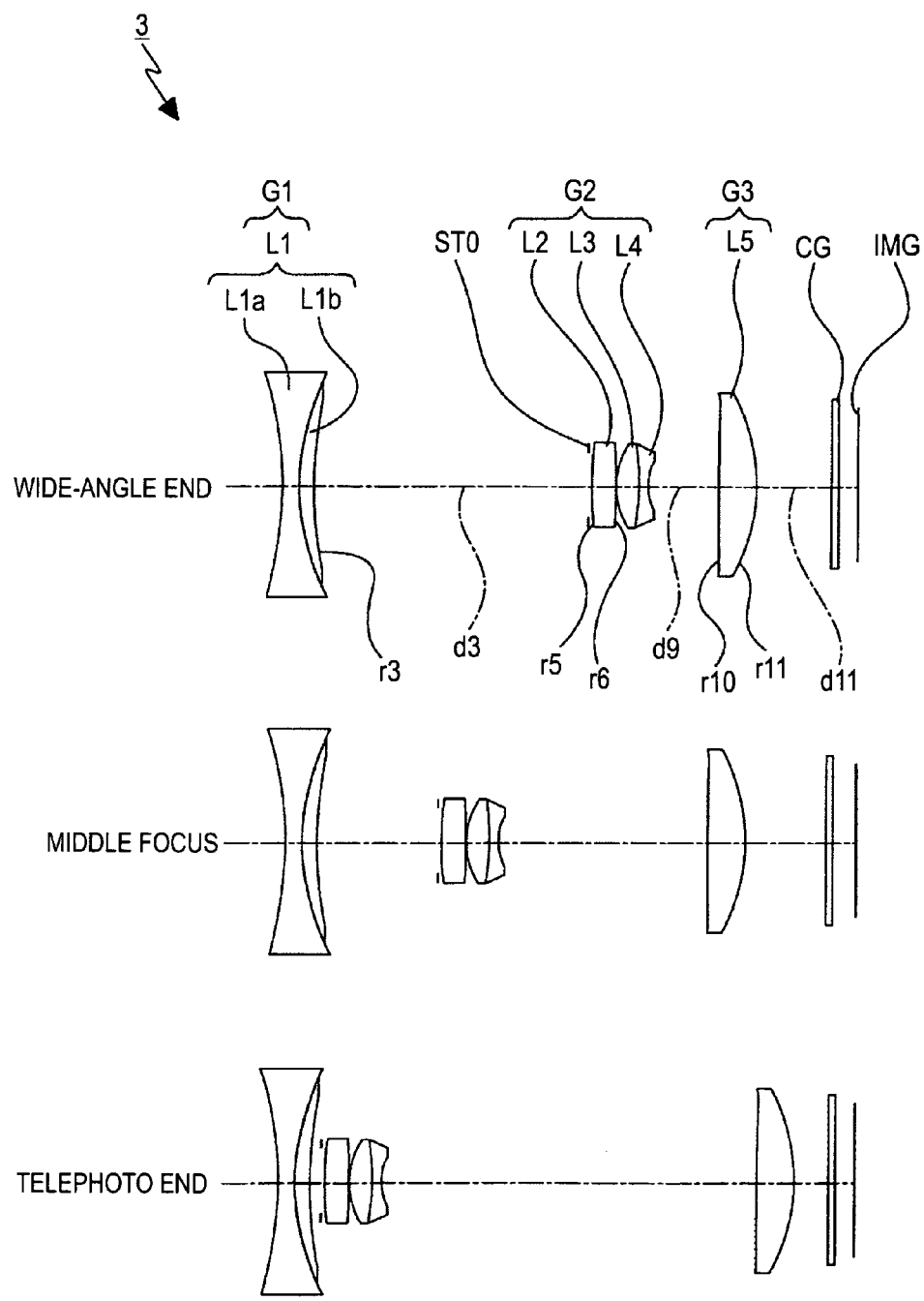
FIG. 9 is a diagram illustrating a lens configuration of a zoom lens according to a third embodiment of the invention.

FIG. 9 shows a lens configuration of a zoom lens 3 according to a third embodiment of the invention.

The zoom lens 3 includes, in order from the object side to the image side: a first lens group G1 which has a negative refractive power; a second lens group G2 which has a positive refractive power; and a third lens group G3 which has a positive refractive power.

In the zoom lens 3, the zoom ratio is set to be 3.7 times.

The first lens group G1 includes a single compound aspheric lens L1 formed of a spherical glass lens L1$a$ which has a negative refractive power and has a biconcave shape and a resin lens L1$b$ which has a positive refractive power and is formed on the image side surface of the spherical glass lens L1$a$.

The second lens group G2 includes, in order from the object side to the image side: a positive lens L2 which is a single lens having a biconvex shape; and a cemented lens which is formed of a positive lens L3 having a biconvex shape and a negative lens L4 having a biconcave shape and disposed to be close to the image side of the positive lens L3.

The third lens group G3 includes a positive lens L5 which has a biconvex shape.

An aperture diaphragm STO is disposed to be close to the object side of the second lens group G2.

A cover glass CG is disposed between the third lens group G3 and the image plane IMG.

Table 9 shows the lens data of Numerical Example 3 of the zoom lens 3, to which specific numerical values are applied, according to the third embodiment.

TABLE 9

| i | ri | di | ni | vi |
|---|---|---|---|---|
| 1 | −21.7480 | 0.800 | 1.61800 | 63.39 |
| 2 | 13.1525 | 0.800 | 1.63200 | 23.41 |
| 3 (ASP) | 24.8624 | Variable | | |
| 4 (Aperture diaphragm) | ∞ | 0.200 | | |
| 5 (ASP) | 23.7153 | 1.300 | 1.80139 | 45.45 |
| 6 (ASP) | −38.4623 | 0.100 | | |
| 7 | 4.2262 | 1.300 | 1.83500 | 42.98 |
| 8 | −12.9753 | 0.500 | 1.71736 | 29.50 |
| 9 | 3.2018 | Variable | | |
| 10 (ASP) | 155.2940 | 2.133 | 1.52500 | 56.45 |
| 11 (ASP) | −8.4836 | Variable | | |
| 12 | ∞ | 0.300 | 1.56883 | 56.04 |
| 13 | ∞ | 1.100 | | |
| IMG | ∞ | 0.000 | | |

In the zoom lens 3, the image side surface (the third surface) of the resin lens L1*b* of the first lens group G1, both surfaces (the fifth surface and the sixth surface) of the positive lens L2 of the second lens group G2, and both surfaces (the tenth surface and the eleventh surface) of the positive lens L5 of the third lens group G3 are formed to be aspheric. Table 10 shows the 4th-order, 6th-order, 8th-order, and 10th-order aspheric coefficients A, B, C, and D of the aspheric surfaces in Numerical Example 3 together with the conic constant K.

TABLE 10

| i | K | A | B | C | D |
|---|---|---|---|---|---|
| 3 | 0.00000E+00 | −1.51724E−04 | 8.00000E−06 | −2.77522E−07 | 3.77924E−09 |
| 5 | 0.00000E+00 | 8.00000E−06 | 1.29425E−04 | −1.10000E−05 | 1.00000E−06 |
| 6 | 0.00000E+00 | 5.30086E−04 | 1.11907E−04 | −3.00000E−06 | 1.00000E−06 |
| 10 | 0.00000E+00 | 4.26533E−04 | −5.70000E−05 | 3.00000E−06 | −7.52306E−08 |
| 11 | 0.00000E+00 | 1.45015E−03 | −1.04822E−04 | 5.00000E−06 | −1.06088E−07 |

Table 11 shows the F numbers Fno and the half angles of view ω in the wide-angle end state (f=6.20), the middle focal length state (f=11.60) and the telephoto end state (f=23.19) in Numerical Example 3.

TABLE 11

| | Wide-angle end | Middle focus | Telephoto end |
|---|---|---|---|
| f | 6.20 | 11.60 | 23.19 |
| Fno | 3.08 | 4.20 | 6.75 |
| ω | 29.31 | 18.46 | 9.50 |

In the zoom lens 3, during zooming between the wide-angle end state and telephoto end state, the surface spacing d3 between the first lens group G1 and the second lens group G2 (the aperture diaphragm STO), the surface spacing d9 between the second lens group G2 and the third lens group G3, and the surface spacing d11 between the third lens group G3 and the cover glass CG are varied. Table 12 shows the variable spaces of the surface spacings in the wide-angle end state (f=6.20), the middle focal length state (f=11.60) and the telephoto end state (f=23.19) in Numerical Example 3.

TABLE 12

| | Wide-angle end | Middle focus | Telephoto end |
|---|---|---|---|
| d3 | 14.901 | 5.683 | 0.700 |
| d9 | 3.661 | 9.322 | 19.701 |
| d11 | 4.128 | 3.601 | 1.843 |

Figure 10:
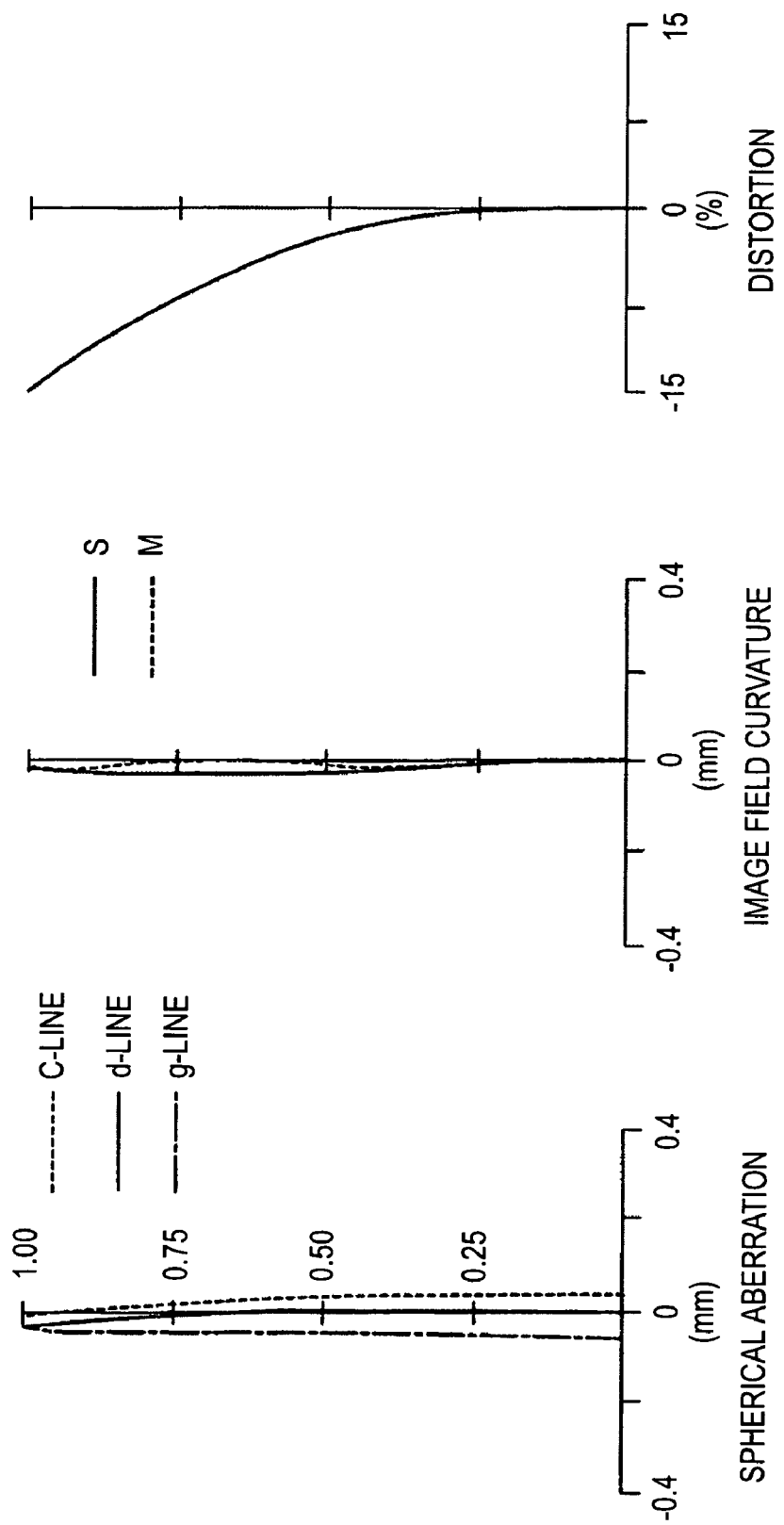
FIG. 10 is a diagram illustrating aberrations in a Numerical Example of the third embodiment to which specific numerical values are applied, together with FIGS. 11 and 12, the diagram illustrating spherical aberration, image field curvature, and distortion in the wide-angle end state.
Figure 11:
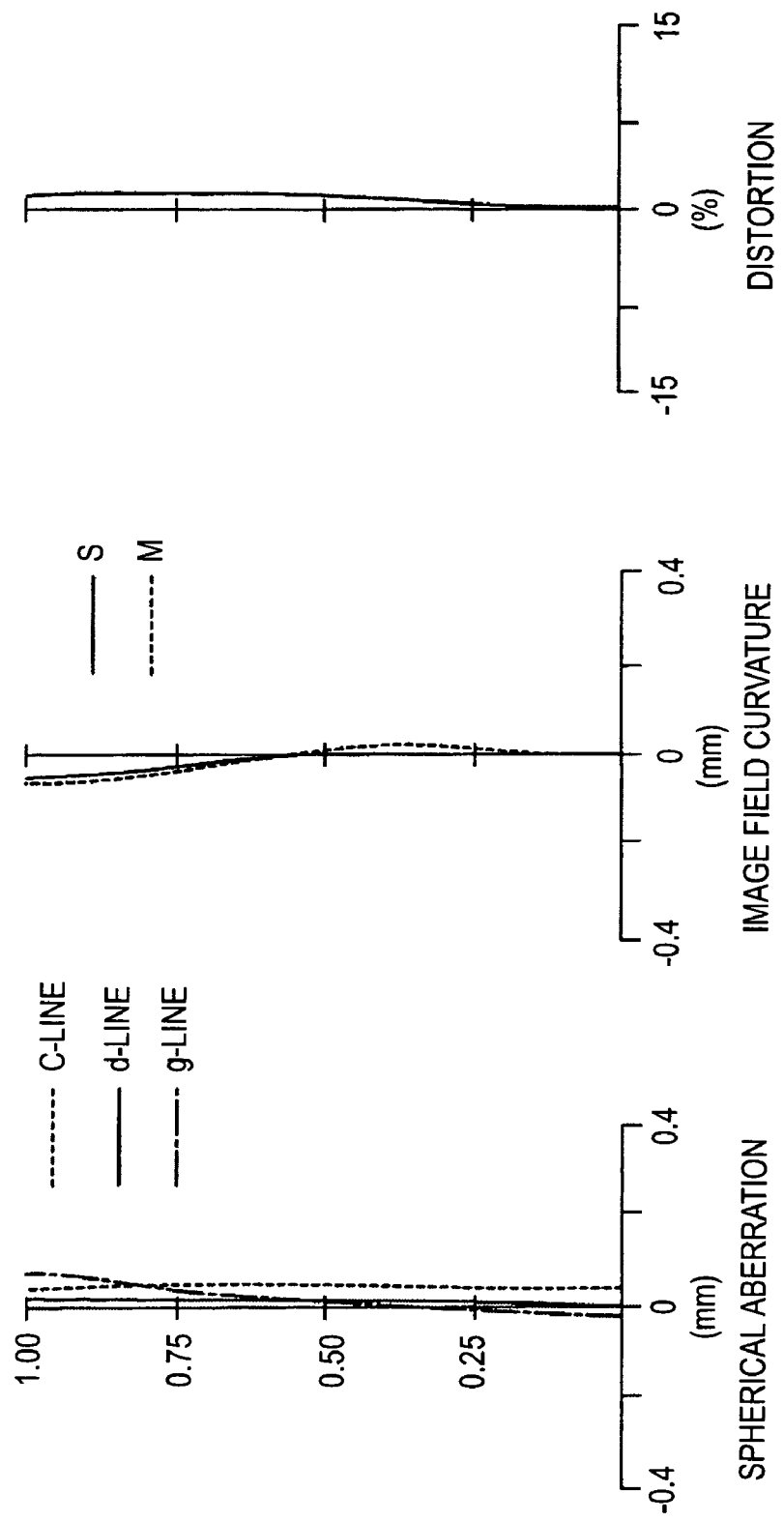
FIG. 11 is a diagram illustrating spherical aberration, image field curvature, and distortion in the middle focal length state.
Figure 12:
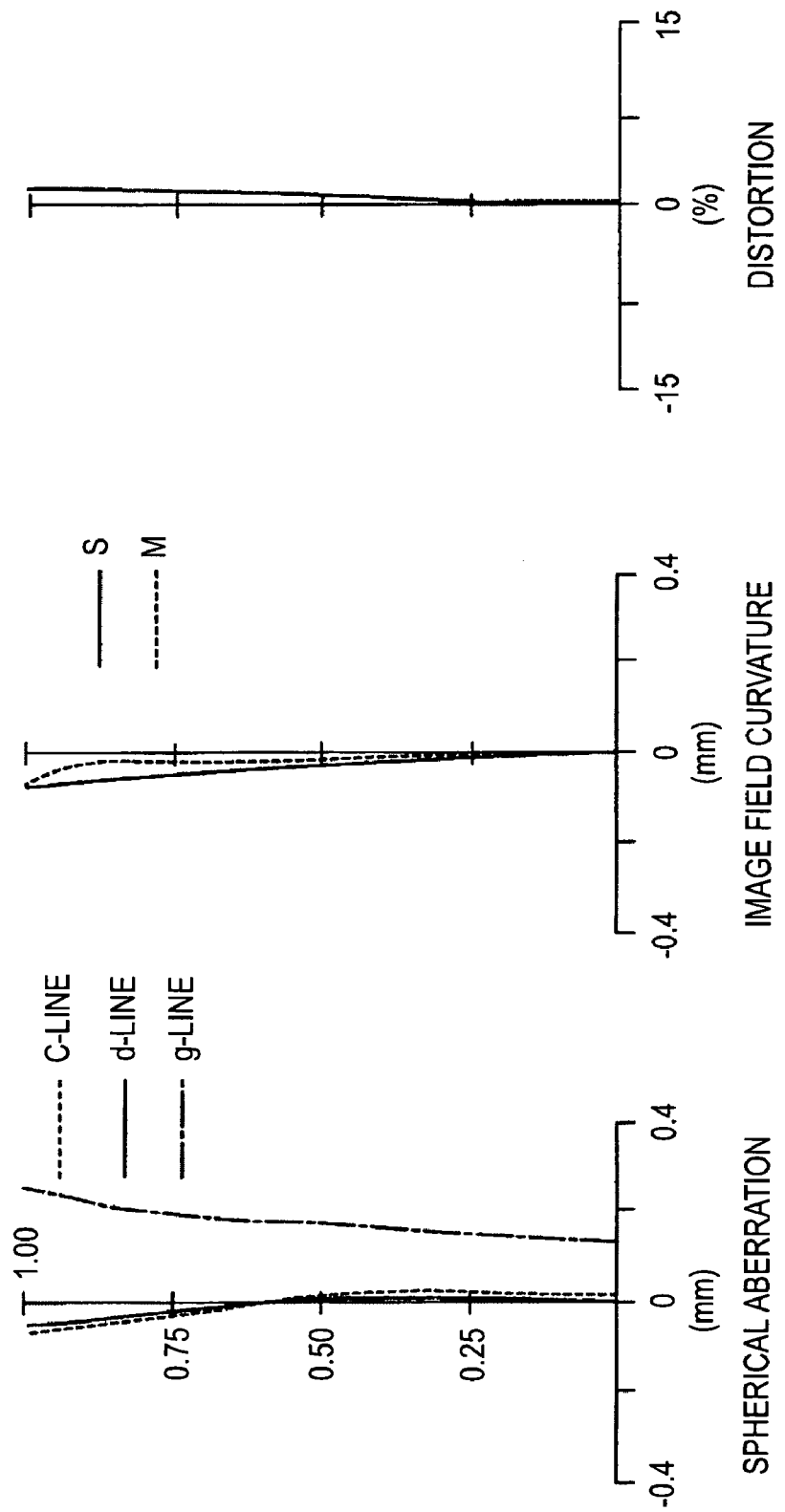
FIG. 12 is a diagram illustrating spherical aberration, image field curvature, and distortion in the telephoto end state.

FIGS. 10 to 12 show various aberrations diagrams in the infinity focus condition of Numerical Example 3. FIG. 10 shows various aberrations diagrams in the wide-angle end state (f=6.20). FIG. 11 shows various aberrations diagrams in the middle focal length state (f=11.60). FIG. 12 shows various aberrations diagrams in the telephoto end state (f=23.19).

In each spherical aberration diagram of FIGS. 10 to 12, the solid line represents the d-line (the wavelength of 587.6 nm), the chain line represents the g-line (the wavelength of 435.8 nm), and the dotted line represents the C-line (the wavelength of 656.3 nm). In each image field curvature diagram, the solid line represents a value on the sagittal image plane, and the dashed line shows a value on the meridional image plane.

As can be clearly seen from the aberration diagrams, in Numerical Example 3, it is possible to obtain an excellent imaging performance by satisfactorily correcting various aberrations.

[Values of Conditional Expression of Zoom Lens]

Hereinafter, the values of the conditional expressions of the zoom lens according to the embodiment of the invention will be described.

Table 13 shows the values of conditional expressions (1) to (12) of the zoom lenses 1 to 3.

TABLE 13

| | | Zoom lens 1 | Zoom lens 2 | Zoom lens 3 |
|---|---|---|---|---|
| | fl1 | −12.60 | −13.12 | −13.10 |
| | fw | 6.50 | 5.80 | 6.20 |
| Conditional expression (1) | fl1/fw | −1.94 | −2.26 | −2.11 |
| Conditional expression (2) | n11 | 1.62 | 1.62 | 1.62 |
| Conditional expression (3) | v11 | 63.39 | 63.39 | 63.39 |
| Conditional expression (4) | G1r1 | −17.94 | −17.88 | −21.75 |
| Conditional expression (5) | d12 | 0.75 | 0.62 | 0.80 |
| Conditional expression (6) | hn | 3.08 | 2.73 | 3.58 |
| | d | 1.60 | 1.42 | 1.60 |
| Conditional expression (7) | d/fw | 0.24 | 0.24 | 0.26 |
| | fl2 | 41.34 | 55.79 | 42.57 |
| Conditional expression (8) | fl1/fl2 | −0.30 | −0.24 | −0.31 |
| | f21 | 17.17 | 19.08 | 18.38 |
| | f2 | 10.28 | 9.67 | 10.95 |
| Conditional expression (9) | f21/f2 | 1.67 | 1.97 | 1.68 |
| | Sg(3a) | −0.03 | −0.04 | −0.04 |
| | Sg(3s) | 0.31 | 0.37 | 0.46 |
| Conditional expression (10) | \|sg(3a)/sg(3s)\| | 0.10 | 0.11 | 0.09 |
| Conditional expression (11) | n12 | 1.61 | 1.63 | 1.63 |

TABLE 13-continued

| | | Zoom lens 1 | Zoom lens 2 | Zoom lens 3 |
|---|---|---|---|---|
| Conditional expression (12) | ν12 | 26.39 | 23.41 | 23.41 |

As can be clearly seen from Table 13, the zoom lenses 1 to 3 are configured to satisfy the conditional expressions (1) to (12).

[Configuration of Imaging Apparatus]

Hereinafter, an imaging apparatus according to an embodiment of the invention will be described.

The imaging apparatus according to the embodiment of the invention includes: a zoom lens; and an imaging device that converts an optical image, which is formed by the zoom lens, into an electric signal.

In the imaging apparatus according to the embodiment of the invention, the zoom lens according to an embodiment of the invention includes, in order from the object side to the image side: a first lens group which has a negative refractive power; a second lens group which has a positive refractive power; and a third lens group which has a positive refractive power.

In the imaging apparatus according to the embodiment of the invention, the zoom lens according to the embodiment of the invention is configured so that the first lens group includes a single compound aspheric lens formed of a spherical glass lens which has a negative refractive power and a resin lens which has a positive refractive power and whose image side surface is formed to be aspheric.

In the imaging apparatus according to the embodiment of the invention, as described above, by adopting the configuration in which the first lens group includes the single compound aspheric lens formed of the spherical glass lens which has a negative refractive power and the resin lens which has a positive refractive power and whose image side surface is formed to be aspheric, the following effects can be obtained.

Since the first lens group is not configured to include a plurality of lenses but configured to include a single lens, there is no deterioration in performance caused by eccentricity between the lenses of the first lens group. Hence, it is not necessary to adjust the centers of the lenses of the first lens group, and it is possible to reduce the manufacturing time. Consequently, as compared with the case where the first lens group is configured to include a plurality of lenses, it is possible to achieve high performance and reduction in cost and thickness (size).

Further, generally, it has been known that, as the position through which rays pass is farther away from the optical axis, the effect of the aspheric surface of the aspheric lens is larger. In the zoom lens having the three-group configuration of negative, positive, and positive groups, the position through which rays pass in the first lens group is far away from the optical axis, in particular, as compared with other lens groups at the wide-angle end.

Accordingly, by forming an aspheric surface in the first lens group, it is possible to effectively improve performance in the peripheral portion of the screen. Further, particularly, by forming an aspheric surface on the resin lens, even when the glass lens is spherical, it is possible to sufficiently improve performance, and thus it is possible to reduce the manufacturing cost.

Moreover, in the first lens group which has a negative refractive power, the refractive power of the positive lens is smaller than the refractive power of the negative lens. Further, generally, change in performance of the resin lens at the time of change in temperature and humidity is larger than that of the glass lens. Accordingly, it is necessary to suppress deterioration in performance at the time of the change in temperature and humidity. Hence, it is difficult to increase the refractive power of the resin lens.

Accordingly, in the same manner as the imaging apparatus according to the embodiment of the invention, by adopting the configuration in which the spherical glass lens has a negative refractive power and the resin lens has a positive refractive power, it is possible to achieve an increase in performance due to the effect of the aspheric surface while suppressing deterioration in performance at the time of change in temperature and humidity.

In addition, in the imaging apparatus according to the embodiment of the invention, by appropriately setting the refractive powers and the Abbe numbers of the negative lens (the spherical glass lens) and the positive lens (the resin lens) of the first lens group as represented by the following conditional expressions (1) to (4), it is possible to effectively correct longitudinal chromatic aberration at the telephoto end.

Further, by using the imaging apparatus according to the embodiment of the invention, it is possible to embody the zoom lens of an imaging optical system whose wide-angle end is about 28 to 38 mm (35 mm film conversion) and the zoom ratio is 2.4 to 3.7 times.

In the imaging apparatus according to the embodiment of the invention, the zoom lens is configured to satisfy the following conditional expressions (1) to (4).

$$f11/fw < -1.8, \quad (1)$$

$$1.55 < n11, \quad (2)$$

$$55 < v11, \text{ and} \quad (3)$$

$$G1r1 < -16.5, \quad (4)$$

where f11 is the focal length of the spherical glass lens in the first lens group, fw is the focal length of the whole lens system at a wide-angle end, n11 is the refractive index of the spherical glass lens in the first lens group at the d-line, ν11 is the Abbe number of the spherical glass lens in the first lens group at the d-line, and G1r1 is the radius of curvature of the object side surface of the spherical glass lens in the first lens group.

In the imaging apparatus according to the embodiment of the invention, by adopting the above-mentioned configuration and satisfying the conditional expressions (1) to (4), it is possible to achieve reduction in size, an increase in performance, and reduction in cost.

The conditional expression (1) defines the ratio of the focal length of the spherical glass lens in the first lens group to the focal length of the whole lens system at the wide-angle end.

When the upper limit of the conditional expression (1) is exceeded, this is advantageous in reduction in size, but the focal length of the first lens group becomes much shorter than the focal length at the wide-angle end (the refractive power of the first lens group becomes too large). Hence, the error sensitivity of a single lens element increases. Further, performance thereof is deteriorated by occurrence of spherical aberration, longitudinal chromatic aberration, and the like.

Accordingly, by making the imaging apparatus satisfy conditional expression (1), it is possible to reduce the error sensitivity of the single lens element and improve performance thereof.

The conditional expression (2) defines the refractive index of the spherical glass lens in the first lens group.

When the lower limit of the conditional expression (2) is exceeded, the refractive index of the spherical glass lens becomes too small, and thus the radius of curvature thereof becomes too small when the refractive power necessary for the spherical glass lens is intended to be applied. For this reason, performance thereof is deteriorated by occurrence of spherical aberration, image field curvature, distortion, and the like.

Accordingly, by making the imaging apparatus satisfy the conditional expression (2), it is possible to apply the refractive power necessary for the spherical glass lens without deteriorating performance thereof.

The conditional expression (3) defines the Abbe number of the spherical glass lens in the first lens group.

When the lower limit of the conditional expression (3) is exceeded, it is difficult to sufficiently correct longitudinal chromatic aberration caused in the spherical glass lens of the first lens group by employing the resin lens. In particular, performance thereof at the telephoto end is deteriorated.

Accordingly, by making the imaging apparatus satisfy the conditional expression (3), it is possible to satisfactorily correct longitudinal chromatic aberration caused in the spherical glass lens of the first lens group by employing the resin lens.

The conditional expression (4) defines the radius of curvature of the object side surface of the spherical glass lens in the first lens group.

When the upper limit of the conditional expression (4) is exceeded, it is difficult to sufficiently correct distortion caused in the object side surface of the spherical glass lens in the first lens group. In particular, performance thereof in the peripheral portion of the screen at the wide-angle end is deteriorated.

Accordingly, by making the imaging apparatus satisfy the conditional expression (4), it is possible to satisfactorily correct distortion caused in the spherical glass lens of the first lens group.

In the imaging apparatus according to the embodiment of the invention, all the lens groups of the first lens group, the second lens group, and the third lens group are configured to be movable in the direction of the optical axis.

On the wide-angle side (short focus), by widening the space between the first lens group and the second lens group and reducing the space between the second lens group and the image plane, the principal point is set to be close to the image plane, and thereby the focal length becomes short.

On the telephoto side (long focus), by reducing the space between the first lens group and the second lens group and widening the space between the second lens group and the image plane, the principal point is set to be far from the image plane, and thereby the focal length becomes long.

Further, by making the third lens group movable in the direction of the optical axis, fluctuation in position of the focus at the respective angles of view is absorbed in the third lens group. In such a manner, it is possible to secure reduction in size and an increase in performance.

[Embodiment of Imaging Apparatus]

FIG. 13 shows a block diagram of a digital still camera of the imaging apparatus according to the embodiment of the invention.

The imaging apparatus (the digital still camera) 100 includes: a camera block 10 that has a function of taking an image; a camera signal processing section 20 that performs a signal processing such as an analog-to-digital conversion processing on a taken image signal; an image processing section 30 that performs a process of recording and reproducing the image signal; an LCD (Liquid Crystal Display) 40 that displays the taken image and the like; a R/W (reader/writer) 50 that performs writing and reading the image signal on the memory card 1000; a CPU (Central Processing Unit) 60 that controls the entire imaging apparatus; an input section 70, such as various switches, that is used for a user to perform a required operation; and a lens driving control section 80 that controls driving of the lens within the camera block 10.

The camera block 10 includes: an optical system including the zoom lens 11 (the zoom lenses 1, 2, and 3 according to the embodiments of the invention); and an imaging device 12 including, for example, a CCD (Charge Coupled Device), a CMOS (Complementary Metal Oxide Semiconductor) or the like.

The camera signal processing section 20 is configured to perform signal processes, such as a process of conversion into a digital signal, noise removal, image quality correction, and a process of conversion into luminance and chromatic difference signals, on the output signal which is output from the imaging device 12.

The image processing section 30 is configured to perform a process of coding for compression and decoding for decompression on an image signal based on a predetermined image data format, a process of conversion of data specification such as resolution, and the like.

The LCD 40 has a function to display various data such as a condition of the operation performed by a user with the aid of the input section 70 and a taken image.

The R/W 50 is configured to write image data, which is encoded by the image processing section 30, into the memory card 1000 and read the image data which is recorded on the memory card 1000.

The CPU 60 functions as a control processing section to control all the circuit blocks within the imaging apparatus 100, and controls the circuit blocks on the basis of the instruction input signals and the like from the input section 70.

The input section 70 includes, for example, a shutter release button for performing a shutter operation, a selection switch for selecting operation modes, and the like. The input section 70 is configured to output the instruction input signal in response to the user's operation to the CPU 60.

The lens driving control section 80 is configured to control a motor and the like, which is not shown in the drawing, for driving the lenses within the zoom lens 11 on the basis of the control signal from the CPU 60.

The memory card 1000 is, for example, a semiconductor memory which is removable from a slot connected to the R/W 50.

Next, operations of the imaging apparatus 100 will be described.

When the photographing is standby, an image signal captured by the camera block 10 under the control of the CPU 60 is output to the LCD 40 through the camera signal processing section 20 so as to be displayed as a camera-through-image. Further, when the instruction input signal for zooming is input from the input section 70, the CPU 60 outputs a control signal to the lens driving control section 80, and moves predetermined lenses within the zoom lens 11 on the basis of the control of the lens driving control section 80.

When the not-shown shutter of the camera block 10 is operated by the instruction input signal from the input section 70, the captured image signal is output from the camera signal processing section 20 to the image processing section 30, is encoded for compression, and is converted into digital data of the predetermined data format. The converted data is output to the R/W 50, and is written in the memory card 1000.

For focusing, the lens driving control section 80 moves the predetermined lenses of the zoom lens 11 on the basis of the control signal received from the CPU 60, for example, when the shutter release button of the input section 70 is pressed halfway or pressed fully for recording (photography).

For reproduction of image data recorded in the memory card 1000, the R/W 50 reads out the predetermined image data from the memory card 1000 in response to the operation performed on the input section 70. The readout image data is decoded for decompression by the image processing section 30 and the reproduced image signal is then outputted to the LCD 40, thereby displaying the reproduced image.

The embodiment has described the case where the imaging apparatus according to the embodiment of the invention is applied to a digital still camera. However, the application range of the imaging apparatus is not limited to the digital still camera, and it may also be widely applied to a camera part or the like of digital input/output apparatuses such as a digital video camera, a mobile phone equipped with a camera, and a PDA (Personal Digital Assistant) equipped with a camera.

The shapes of components and the numerical values described or shown in the above-mentioned embodiments are only illustrative examples of the embodiments for carrying out the invention, and they should not be interpreted as limiting the technical scope of the invention.

The present application contains subject matter related to that disclosed in Japanese Priority Patent Application JP 2009-167633 filed in the Japan Patent Office on Jul. 16, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising,
a combination of only three lens groups including:
in order from an object side to an image side:
a first lens group which has a negative refractive power;
a second lens group which has a positive refractive power; and
a third lens group which has a positive refractive power,
wherein the second lens group is disposed directly between the first and third lens groups,
wherein the first lens group includes a single compound aspheric lens formed of a spherical glass lens which has a negative refractive power and a resin lens which has a positive refractive power and whose image side surface is formed to be aspheric,
wherein the following conditional expressions (1) to (4) are satisfied $$f11/fw < -1.8, \quad (1)$$

$$1.55 < n11, \quad (2)$$

$$55 < v11, \text{ and} \quad (3)$$

$$G1r1 < -16.5, \quad (4)$$

where
f11 is a focal length of the spherical glass lens in the first lens group,
fw is a focal length of the whole lens system at a wide-angle end,
n11 is a refractive index of the spherical glass lens in the first lens group at the d-line,
v11 is an Abbe number of the spherical glass lens in the first lens group at the d-line, and
G1r1 is a radius of curvature of an object side surface of the spherical glass lens in the first lens group.

2. The zoom lens according to claim 1, wherein the following conditional expression (5) is satisfied $$0.4 < d12 < 0.9, \quad (5)$$

where
d12 is a center thickness of the resin lens in the first lens group.

3. The zoom lens according to claim 1, wherein the following conditional expression (6) is satisfied $$hn < 5, \quad (6)$$

where
hn is a thickness deviation ratio of the resin lens in the first lens group.

4. The zoom lens according to claim 1, wherein the following conditional expressions (7) and (8) are satisfied $$d/fw < 0.35, \text{ and} \quad (7)$$

$$f11/f12 > -0.5, \quad (8)$$

where
d is a center thickness of the first lens group, and
f12 is a focal length of the resin lens in the first lens group.

5. The zoom lens according to claim 1,
wherein the second lens group includes, in order from the object side to the image side, a single lens which has a positive refractive power and having a convex surface facing towards the object side, and a cemented lens which has a negative refractive power and is formed by cementing a positive lens and a negative lens, and
wherein the following conditional expression (9) is satisfied $$f21/f2 < 3.5, \quad (9)$$

where
f21 is a focal length of the single lens, which has the positive refractive power, in the second lens group, and
f2 is a focal length of the second lens group.

6. The zoom lens according to claim 1,
wherein the object side surface of the spherical glass lens in the first lens group is formed to be concave toward the object side, and
wherein the following conditional expressions (10) to (12) are satisfied $$0.05 < |sg(3a)/sg(3s)|, \quad (10)$$

$$n12 > 1.5, \text{ and} \quad (11)$$

$$v12 < 30, \quad (12)$$

where
sg(3a) is an aspheric sag amount of a surface of the compound aspheric lens closest to the image side in the first lens group at an effective diameter position thereof,
sg(3s) is a spherical sag amount of the surface of the compound aspheric lens closest to the image side in the first lens group at the effective diameter position thereof,
n12 is a refractive index of the resin lens in the first lens group at the d-line, and
v12 is an Abbe number of the resin lens in the first lens group at the d-line.

7. An imaging apparatus comprising:
a zoom lens including a combination of only three lens groups; and an imaging device that converts an optical image, which is formed by the zoom lens, into an electric signal, wherein the combination of only three lens groups includes, in order from an object side to an image side,
a first lens group which has a negative refractive power,
a second lens group which has a positive refractive power, and
a third lens group which has a positive refractive power, wherein the second lens group is disposed directly between the first and third lens groups, wherein the first lens group includes a single compound aspheric lens formed of a spherical glass lens which has a negative refractive power and a resin lens which has a positive refractive power and whose image side surface is formed to be aspheric, wherein the following conditional expressions (1) to (4) are satisfied $$f11/fw < -1.8, \quad (1)$$

$$1.55 < n11, \quad (2)$$

$$55 < v11, \text{ and} \quad (3)$$

$$G1r1 < -16.5, \quad (4)$$

where
$f11$ is a focal length of the spherical glass lens in the first lens group,
$fw$ is a focal length of the whole lens system at a wide-angle end,
$n11$ is a refractive index of the spherical glass lens in the first lens group at the d-line,
$v11$ is an Abbe number of the spherical glass lens in the first lens group at the d-line, and
$G1r1$ is a radius of curvature of an object side surface of the spherical glass lens in the first lens group.

8. The zoom lens according to claim 1, wherein the first, second and third lens groups are disposed along an optical axis and are spaced apart relative to one another and movable along the optical axis relative to a reference plane disposed on the image side to and among a wide-angle state, a middle focus state and a telephoto state such that:

moving from the wide-angle state to the middle focus state, the third lens group moves towards the reference plane while the second lens group moves towards the first lens group and away from the reference plane and the first lens group moves towards the second lens group and the reference plane; and moving from the middle focus state to the telephoto state, the third lens group moves towards the reference plane while the second lens group moves towards the first lens group and away from the reference plane and the first lens group moves away from the reference plane.

9. The imaging apparatus according to claim 7, wherein the first, second and third lens groups are disposed along an optical axis and are spaced apart relative to one another and movable along the optical axis relative to a reference plane disposed on the image side to and among a wide-angle state, a middle focus state and a telephoto state such that:

moving from the wide-angle state to the middle focus state, the third lens group moves towards the reference plane while the second lens group moves towards the first lens group and away from the reference plane and the first lens group moves towards the second lens group and the reference plane; and moving from the middle focus state to the telephoto state, the third lens group moves towards the reference plane while the second lens group moves towards the first lens group and away from the reference plane and the first lens group moves away from the reference plane.

* * * * *